(12) United States Patent
Soliman et al.

(10) Patent No.: US 8,768,373 B2
(45) Date of Patent: Jul. 1, 2014

(54) ADAPTIVE FLEXIBLE BANDWIDTH WIRELESS SYSTEMS

(75) Inventors: Samir Salib Soliman, San Diego, CA (US); Sherman A. Gregory, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/363,538

(22) Filed: Feb. 1, 2012

(65) Prior Publication Data

US 2013/0115967 A1    May 9, 2013

Related U.S. Application Data

(60) Provisional application No. 61/556,777, filed on Nov. 7, 2011.

(51) Int. Cl.
*H04W 72/00* (2009.01)

(52) U.S. Cl.
USPC .............. 455/452.1; 455/450; 455/452.2; 370/329; 370/342

(58) Field of Classification Search
USPC .......... 455/450, 451, 452.1, 452.2, 453, 454; 370/212–213, 252, 328–329, 338, 342, 370/464, 465, 468, 477–479, 482; 375/237–240
See application file for complete search history.

(56) References Cited

U.S. PATENT DOCUMENTS

| | | |
|---|---|---|
| 5,117,443 A | 5/1992 | Shires |
| 5,640,385 A | 6/1997 | Long et al. |

(Continued)

FOREIGN PATENT DOCUMENTS

| | | |
|---|---|---|
| EP | 1993237 A2 | 11/2008 |
| EP | 2493257 A1 | 8/2012 |

(Continued)

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 10)", 3GPP Standard; 3GPP TS 36.304, 3rd Generation Partnership Project (3GPP), Mobile Competence Centre; 650, Route des Lucioles ; F-06921 Sophia-Antipolis Cedex ; France, vol. RAN WG2, No. V10.3.0, Sep. 28, 2011, pp. 1-33, XP050554208, [retrieved on Sep. 28, 2011].

(Continued)

*Primary Examiner* — Magdi Elhag
(74) *Attorney, Agent, or Firm* — Jeffrey D. Jacobs

(57) ABSTRACT

Methods, systems, and devices are described for providing flexible bandwidth waveforms and channels for wireless communication. Embodiments may utilize portions of spectrum that may not be large enough to fit a standard or normal waveform. Chip rates may be adapted dynamically to generate and/or to receive flexible bandwidth waveforms to fit these portions of spectrum. Scaling factors and/or center frequencies may also be utilized to generate flexible waveforms. A mobile device may receive adjustment information from a base station so that the mobile device may dynamically adjust its chip rate to utilize a flexible bandwidth channel. A base station may simultaneously transmit on a normal bandwidth channel and a flexible bandwidth channel in some cases. Some flexible bandwidth waveforms may be utilized that are larger, or take more bandwidth, than a normal waveform. Flexible bandwidth may also be utilized to split and/or combine frequency channels.

65 Claims, 17 Drawing Sheets

(56) References Cited

U.S. PATENT DOCUMENTS

| | | | |
|---|---|---|---|
| 6,041,222 A | 3/2000 | Horton et al. | |
| 6,424,826 B1 | 7/2002 | Horton et al. | |
| 6,535,723 B1 | 3/2003 | Jiang et al. | |
| 6,539,050 B1 | 3/2003 | Lee et al. | |
| 6,693,887 B2 | 2/2004 | Stanwood et al. | |
| 6,694,147 B1 | 2/2004 | Viswanath et al. | |
| 6,845,238 B1 | 1/2005 | Muller | |
| 6,944,460 B2 * | 9/2005 | Haartsen | 455/452.2 |
| 7,321,780 B2 | 1/2008 | Love et al. | |
| 7,394,792 B1 * | 7/2008 | von der Embse | 370/335 |
| 7,535,900 B2 | 5/2009 | Shenoi | |
| 7,558,310 B1 * | 7/2009 | von der Embse | 375/130 |
| 7,602,707 B2 | 10/2009 | Guo et al. | |
| 7,969,858 B2 | 6/2011 | Laroia et al. | |
| 8,000,706 B2 | 8/2011 | Lee et al. | |
| 8,045,972 B2 | 10/2011 | Ferzali et al. | |
| 8,325,670 B2 * | 12/2012 | Afrashteh et al. | 370/330 |
| 2002/0158801 A1 | 10/2002 | Crilly et al. | |
| 2003/0203721 A1 * | 10/2003 | Berezdivin et al. | 455/126 |
| 2008/0095108 A1 | 4/2008 | Malladi et al. | |
| 2008/0165892 A1 * | 7/2008 | Yang et al. | 375/299 |
| 2008/0227453 A1 | 9/2008 | Somasundaram et al. | |
| 2009/0016320 A1 | 1/2009 | Li et al. | |
| 2009/0074039 A1 * | 3/2009 | Miller | 375/150 |
| 2009/0116389 A1 | 5/2009 | Ji et al. | |
| 2009/0161732 A1 * | 6/2009 | Miller et al. | 375/141 |
| 2009/0274096 A1 | 11/2009 | Fu | |
| 2010/0061496 A1 | 3/2010 | Black et al. | |
| 2010/0124940 A1 | 5/2010 | Hassan et al. | |
| 2010/0157910 A1 | 6/2010 | Nentwig et al. | |
| 2010/0159859 A1 | 6/2010 | Rofougaran | |
| 2010/0195618 A1 | 8/2010 | Park et al. | |
| 2010/0195619 A1 | 8/2010 | Bonneville et al. | |
| 2010/0195668 A1 | 8/2010 | Robert et al. | |
| 2010/0214031 A1 * | 8/2010 | Yamamoto et al. | 331/34 |
| 2010/0222060 A1 | 9/2010 | Zhang et al. | |
| 2010/0234040 A1 | 9/2010 | Palanki et al. | |
| 2010/0240356 A1 | 9/2010 | Lee et al. | |
| 2010/0322109 A1 | 12/2010 | Ahn et al. | |
| 2011/0064162 A1 | 3/2011 | Mccallister et al. | |
| 2011/0080893 A1 | 4/2011 | Fong et al. | |
| 2011/0085497 A1 | 4/2011 | Fang et al. | |
| 2011/0086657 A1 | 4/2011 | Koivisto et al. | |
| 2011/0103330 A1 | 5/2011 | Montojo et al. | |
| 2011/0128922 A1 | 6/2011 | Chen et al. | |
| 2011/0164707 A1 | 7/2011 | Luo et al. | |
| 2012/0002643 A1 | 1/2012 | Chung et al. | |
| 2012/0044844 A1 * | 2/2012 | Trainin | 370/310 |
| 2013/0114415 A1 | 5/2013 | Das et al. | |
| 2013/0114433 A1 | 5/2013 | Park et al. | |
| 2013/0114436 A1 | 5/2013 | Dural et al. | |
| 2013/0114473 A1 | 5/2013 | Awoniyi et al. | |
| 2013/0114566 A1 | 5/2013 | Awoniyi et al. | |
| 2013/0114571 A1 | 5/2013 | Das et al. | |
| 2013/0115991 A1 | 5/2013 | Awoniyi et al. | |
| 2013/0115994 A1 | 5/2013 | Awoniyi et al. | |
| 2013/0121265 A1 | 5/2013 | Awoniyi et al. | |
| 2013/0148520 A1 | 6/2013 | Das et al. | |
| 2013/0148527 A1 | 6/2013 | Awiniyi et al. | |
| 2013/0148576 A1 | 6/2013 | Huang et al. | |
| 2013/0148579 A1 | 6/2013 | Das et al. | |
| 2013/0148627 A1 | 6/2013 | Das et al. | |
| 2013/0148628 A1 | 6/2013 | Das et al. | |
| 2013/0148629 A1 | 6/2013 | Das et al. | |
| 2013/0150045 A1 | 6/2013 | Das et al. | |
| 2013/0182655 A1 | 7/2013 | Das et al. | |
| 2013/0329670 A1 | 12/2013 | Tang et al. | |

FOREIGN PATENT DOCUMENTS

| | | |
|---|---|---|
| GB | 2386506 A | 9/2003 |
| WO | 9900911 A1 | 1/1999 |
| WO | 0120942 A1 | 3/2001 |
| WO | 2005112566 A2 | 12/2005 |
| WO | 2007148911 A1 | 12/2007 |
| WO | 2008015512 A2 | 2/2008 |
| WO | 2010105232 | 9/2010 |
| WO | 2010141607 | 12/2010 |
| WO | 2011047619 A1 | 4/2011 |
| WO | 2011053974 | 5/2011 |

OTHER PUBLICATIONS

3GPP TS 36.331, "3rd Generation Partnership Project; Technical Specification Group Radio Access Network; Evolved Universal Terrestrial Radio Access (E-UTRA); Radio Resource Control (RRC); Protocol specificatin (Release 10)", 3GPP Standard; 3GPP TS 36.331, 3rd Generation Partnership Project (3GPP), Mobile Competence Centre ; 650, Route des Lucioles ; F-06921 Sophia-Antipolis Cedex ; France, vol. RAN WG2, No. V10.3.0, Sep. 30, 2011, pp. 1-296, XP050554294, [retrieved on Sep. 30, 2011].

3GPPTS 36.101, "3rd Generation Partnership Project; Technical Specification Group Radio Access Network; Evolved Universal Terrestrial Radio Access (E-UTRA); User Equipment (UE) radio transmission and reception (Release 10)", 3GPP Standard; 3GPP TS 36.101, 3rd Generation Partnership Project (3GPP), Mobile Competence Centre ; 650, Route des Lucioles; F-06921 Sophia-Antipolis Cedex ; France, vol. RAN WG4, No. V10.4.0, Oct. 3, 2011, pp. 1-242, XP050554352, [retrieved on Oct. 3, 2011].

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP Standard; 3GPP TS 36.300, 3rd Generation Partnership Project (3GPP), Mobile Competence Centre ; 650, Route des Lucioles ; F-06921 Sophia-Antipolis Cedex; France, vol. RAN WG2, No. V10.5.0, Sep. 28, 2011, pp. 1-194.

Huawei, "R2-084311: Scaling measurement and cell reselection parameters," 3GPP TSG RAN WG2 #63 [Online] 2008, pp. 1-8.

International Search Report and Written Opinion—PCT/US2012/063880—ISA/EPO—Jun. 6, 2013.

Lin, et al., "Mobility management: from GPRS to UMTS," Wireless Communications and Mbile Cmputing, 2001, pp. 339-359.

NEC Group: "Framework to define additional carrier type: Carrier segments", R1-113227, 3rd Generation Partnership Project (3GPP), Mobile Competence Centre ; 650, Route des Lucioles ; F-06921 Sophia-Antipolis Cedex ; France, vol. RAN WG1, No. Zhuhai; Oct. 4, 2011,XP050538345.

R2-073069: E-UTRA Cell Selection and Cell Reselection Aspects. 3GPP TSG-RAN WG2 Meeting #59 [Online] 2007, pp. 1-11.

Co-pending U.S. Appl. No. 13/707,111, filed Dec. 6, 2012.

* cited by examiner

800

| Parameter | Standard waveform | Flexible waveform for Macrocell | Flexible waveform for Femtocell | Flexible Waveform Extended range for Macrocell |
|---|---|---|---|---|
| Bandwidth | W | W/N | W/N | W/N |
| Data Rate | R | R/N | R | R/N |
| Tx. Power | P | P/N | P/N | P |
| Range | D | D | D | $D*N^{(1/a)}$ |
| Capacity | C | C | C/N | C |

FIG. 8

ADAPTIVE FLEXIBLE BANDWIDTH WIRELESS SYSTEMS

CROSS-RELATED APPLICATIONS

The present Application for Patent claims priority to Provisional Application No. 61/556,777 entitled "FRACTIONAL SYSTEMS IN WIRELESS COMMUNICATIONS" filed Nov. 7, 2011, and assigned to the assignee hereof and hereby expressly incorporated by reference herein.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communications system may include a number of base stations, each simultaneously supporting communication for multiple mobile terminals. Base stations may communicate with mobile terminals on downstream and upstream links. Each base station has an assigned frequency band of spectrum and coverage range, which may be referred to as the coverage area of the cell. Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be un-utilized part of the spectrum. As the use of wireless devices has increased, the demand for and value of this spectrum has surged, as well. Nonetheless, in some cases, wireless communications systems do not utilize portions of the allocated spectrum because the portions are not big enough to fit a standard or normal waveform. The developers of the LTE standard recognized the problem and decided to support 6 different system bandwidths, namely 1.4, 3, 5, 10, 15 and 20 MHz. This may provide one partial solution to the problem. Furthermore, to support higher capacity under certain traffic load conditions, cell splitting may occur in the spatial domain. In other words, the coverage area of a cell may be spatially divided into smaller geographical areas. The spatial splitting approach, however, generally requires more towers, more equipment, and/or additional backhaul connections. To support higher peak data rates, two separate and independent channels may be assigned to one user in some cases.

SUMMARY

Methods, systems, and devices are described for providing flexible bandwidth waveforms and channels for wireless communication. Embodiments may utilize portions of spectrum that may not be large enough to fit a current standard or normal waveform. Chip rates may be adapted, sometimes dynamically, to generate and/or receive flexible bandwidth waveforms to fit these portions of spectrum. Some embodiments may utilize scaling factors to implement adapting the chip rate. Flexible bandwidth may also be utilized to generate waveforms that are larger, or take more bandwidth, than standard or normal waveforms in some cases. Flexible bandwidth can be used to split existing channels into multiple narrower frequency channels to support higher capacity. Flexible bandwidth may also be used to combine multiple channels into one wider frequency channel to support higher peak data rates.

Some embodiments may include identifying a chip rate of a mobile device. The chip rate may be dynamically adapted such that the mobile device may communicate over a flexible bandwidth channel. A mobile device may receive adjustment information from a base station to adapt the chip rate of the mobile device. The mobile device may also receive flexible bandwidth waveforms over the flexible bandwidth channel.

Some embodiments may include determining a flexible bandwidth channel at a base station. The base station may transmit on a normal bandwidth channel and the flexible bandwidth channel simultaneously. The base station may also transmit adaptation information to a mobile device to inform the mobile device of how to adapt its chip rate to receive flexible bandwidth waveforms over the flexible bandwidth channel.

Some embodiments include a method for wireless communication that may include identifying a chip rate of a mobile device. The chip rate of the mobile device may be adapted dynamically such that the mobile device communicates over a flexible bandwidth channel.

The method for wireless communication may include receiving adaptation information from a base station to adapt the chip rate of the mobile device dynamically. One or more center frequencies to identify the flexible bandwidth channel may be received. The method for wireless communication may include receiving one or more flexible bandwidth waveforms over the flexible bandwidth channel in some embodiments.

Some embodiments may include adapting the chip rate on the fly. Adapting the chip rate on the fly may include moving from a normal bandwidth channel to the flexible bandwidth channel as the mobile device adapts the chip rate. Adapting the chip rate on the fly may include tuning from a first center frequency to a second center frequency as the mobile device adapts the chip rate.

In some embodiments, adapting the chip rate includes adapting a frequency of processing of the mobile device. Adapting the chip rate may include using a divider to change the frequency of processing. In some embodiments, adapting the chip rate may include adapting a frequency of at least one clock, wherein the at least one clock includes at least one of an ADC clock, a DAC clock, a processing clock, or an offline clock. Adapting the chip rate may include using a divider to change the frequency of the at least one clock.

In some embodiments, the flexible bandwidth channel is smaller than a current standard or normal bandwidth channel. In some embodiments, the flexible bandwidth channel is larger than a current standard or normal bandwidth channel.

Some embodiments include a method for wireless communication that may include determining a flexible bandwidth channel at a base station. Transmitting on a normal bandwidth channel and the flexible bandwidth channel may occur simultaneously from the base station.

Some embodiments of the method for wireless communication may include adapting a chip rate in the base station to utilize the flexible bandwidth channel. Adaptation information may be transmitted from the base station to a mobile device to inform the mobile device of the adapted chip rate. One or more center frequencies may be communicated to the mobile device to identify the flexible bandwidth channel.

Adapting the chip rate may include adapting a frequency of processing in the base station. In some embodiments, adapting the chip rate includes adapting a frequency of at least one clock, wherein the at least one clock includes at least one of an ADC, a DAC, a processing clock, or an offline clock.

In some embodiments, the standard or normal bandwidth channel and the flexible bandwidth channel utilize the same radio access technology. Adapting the chip rate may be based on a requested quality of service. Adapting the chip rate may be based on a load. Adapting the chip rate may be based on a coverage of one or more adjacent cells.

Some embodiments include a wireless communications system configured for utilizing flexible bandwidth channels. The wireless communications system may include: a means for identifying a chip rate of a mobile device; and/or a means for adapting the chip rate of the mobile device dynamically such that the mobile device communicates over a flexible bandwidth channel.

The wireless communications system may include a means for receiving adaptation information from a base station to adapt the chip rate of the mobile device dynamically. Some embodiments may include a means for receiving one or more centering frequencies to identify the flexible bandwidth channel. Some embodiments may include a means for receiving one or more flexible bandwidth waveforms over the flexible bandwidth channel.

In some embodiments, the wireless communications system may further include a means for adapting the chip rate of the mobile device on the fly. The wireless communications system may include a means for adapting the chip rate on the fly through a means for moving from a normal bandwidth channel to the flexible bandwidth channel as the mobile device adapts the chip rate. The wireless communications system may include a means for adapting the chip rate on the fly through a means for tuning from a first center frequency to a second center frequency as the mobile device adapts the chip rate.

In some embodiments, adapting the chip rate includes adapting a frequency of processing of the mobile device, a frequency of at least one clock, wherein the at least one clock includes at least one of an ADC clock, a DAC clock, a processing clock, or an offline clock.

Some embodiments include a computer program product for utilizing flexible bandwidth channels within a wireless communications system that includes a non-transitory computer-readable medium that may include: code for identifying a chip rate of a mobile device; and/or code for adapting the chip rate of the mobile device dynamically such that the mobile device communicates over a flexible bandwidth channel.

The non-transitory computer-readable medium may include code for receiving adaptation information from a base station to adapt the chip rate of the mobile device dynamically. The non-transitory computer-readable medium may include code for receiving one or more centering frequencies to identify the flexible bandwidth channel. The non-transitory computer-readable medium may include code for receiving one or more flexible bandwidth waveforms over the flexible bandwidth channel. In some embodiments, the adapting the chip rate includes adapting a frequency of processing of the mobile device, a frequency of at least one clock, wherein the at least one clock includes at least one of an ADC clock, a DAC clock, a processing clock, or an offline clock.

In some embodiments, the non-transitory computer-readable medium may include code for adapting the chip rate on the fly. Some embodiments may include code for adapting the chip rate on the fly that may include code for moving from a normal bandwidth channel to the flexible bandwidth channel as the mobile device adapts the chip rate. Some embodiments may include code for adapting the chip rate on the fly that may include code for tuning from a first center frequency to a second center frequency as the mobile device adapts the chip rate.

Some embodiments include a wireless communications device configured for utilizing flexible bandwidth channels. The wireless communications device may include at least one processor configured to: identify a chip rate of a mobile device; and/or adapt the chip rate of the mobile device dynamically such that the mobile device communicates over a flexible bandwidth channel. The wireless communications device may also include at least one memory coupled with the at least one processor.

The at least one processor may be further configured to receive adaptation information from a base station to adapt the chip rate of the mobile device dynamically. The at least one processor may be further configured to receive one or more centering frequencies to identify the flexible bandwidth channel. The at least one processor may be configured to receive one or more flexible bandwidth waveforms over the flexible bandwidth channel in some embodiments. In some embodiments, adapting the chip rate includes adapting a frequency of processing of the mobile device, a frequency of at least one clock, wherein the at least one clock includes at least one of an ADC clock, a DAC clock, a processing clock, or an offline clock.

In some embodiments, the at least one processor may be further configured to adapt the chip rate on the fly. Adapting the chip rate on the fly may include moving from a normal bandwidth channel to the flexible bandwidth channel as the mobile device adapts the chip rate. Adapting the chip rate on the fly may include tuning from a first center frequency to a second center frequency as the mobile device adapts the chip rate.

Some embodiments include a wireless communications system configured for utilizing flexible bandwidth. The wireless communications system may include: a means for determining a flexible bandwidth channel at a base station; and/or a means for transmitting on a normal bandwidth channel and the flexible bandwidth channel simultaneously from the base station.

The wireless communications system may include a means for adapting a chip rate in the base station to utilize the flexible bandwidth channel. The wireless communications system may include a means for transmitting adaptation information from the base station to a mobile device to inform the mobile device of the adapted chip rate. The wireless communications system may include a means for transmitting one or more center frequencies from the base station to the mobile device to identify the flexible bandwidth channel. In some embodiments, adapting the chip rate is based on at least a requested quality of service, a load, or a coverage of one or more adjacent cells.

Some embodiments include a computer program product for utilizing flexible bandwidth within a wireless communications system that includes a non-transitory computer-readable medium that may include: code for determining a flexible bandwidth channel at a base station; and/or code for transmitting on a normal bandwidth channel and the flexible bandwidth channel simultaneously from the base station.

The non-transitory computer-readable medium may include code for adapting a chip rate in the base station to utilize the flexible bandwidth channel. The non-transitory computer-readable medium further may include code for transmitting adaptation information from the base station to a mobile device to inform the mobile device of the adapted chip rate. The non-transitory computer-readable medium may include code for transmitting one or more center frequencies from the base station to the mobile device to identify the flexible bandwidth channel. In some embodiments, adapting the chip rate is based on at least a requested quality of service, a load, or a coverage of one or more adjacent cells.

Some embodiments include wireless communications devices configured for utilizing flexible bandwidth. The wireless communications device may include at least one processor configured to: determine a flexible bandwidth channel at a base station; and/or transmit on a normal bandwidth channel and the flexible bandwidth channel simultaneously from the base station. The wireless communications device may include at least one memory coupled with the at least one processor.

The at least one processor may be configured to adapt a chip rate in the base station to utilize the flexible bandwidth channel. The at least one processor may be configured to transmit adaptation information from the base station to a mobile device to inform the mobile device of the adapted chip rate. The at least one processor may be configured to transmit one or more center frequencies from the base station to the mobile device to identify the flexible bandwidth channel. In some embodiments, adapting the chip rate is based on at least a requested quality of service, a load, or a coverage of one or more adjacent cells.

The foregoing has outlined rather broadly the features and technical advantages of examples according to a disclosure in order that the detailed description that follows may be better understood. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 shows a table that may reflect how the use of flexible bandwidth may impact different parameters within a wireless communications system in accordance with various embodiments;

DETAILED DESCRIPTION

Figure 1:
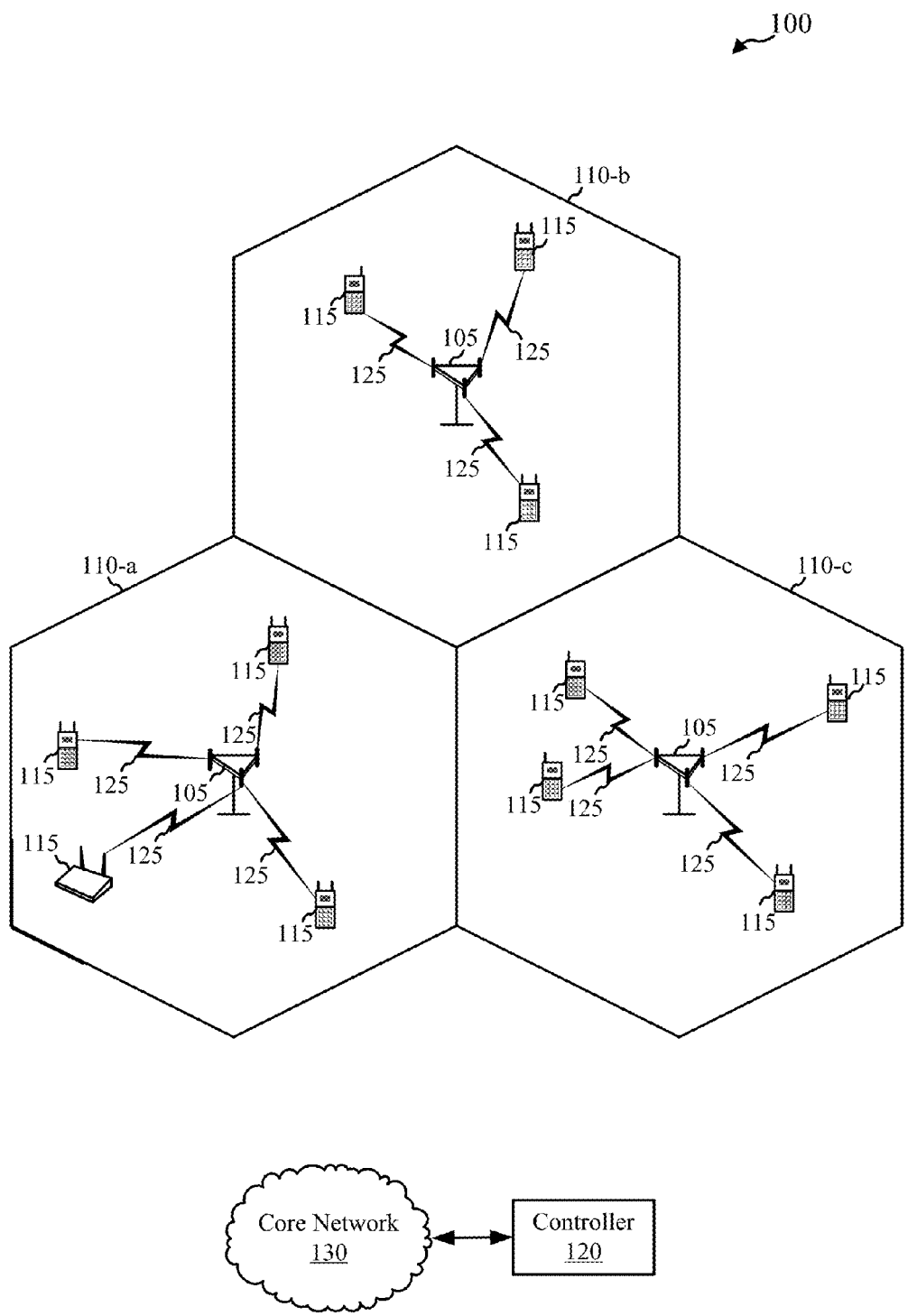
FIG. 1 shows a block diagram of a wireless communications system in accordance with various embodiments.

Methods, systems, and devices are described for providing flexible bandwidth and waveforms for wireless communication. Embodiments may utilize portions of spectrum that may not be big enough to fit a current standard or normal waveform. Chip rates may be adapted, sometimes dynamically, to generate and/or to receive flexible bandwidth waveforms to fit these portions of spectrum. Some embodiments may utilize scaling factors to adapt the chip rates. Flexible bandwidth may also be utilized to generate waveforms that are larger, or take more bandwidth, than current standard or normal waveforms.

Some embodiments of flexible bandwidth may include splitting existing frequency channels into multiple narrower frequency channels, which may support higher capacity. Hence, instead of splitting spatial area covered by a cell site into smaller geographical areas, one can split the frequency channel into multiple narrower frequency channels that has the same coverage but at lower peak data rates. This approach may require a fewer number of towers, less hardware, and/or less backhaul connections. Flexible bandwidth may also include combining multiple frequency channels into one wider frequency channel, which may be utilized to support higher peak data rates, for example.

Some embodiments may include identifying a chip rate of a mobile device. The chip rate may be dynamically adapted such that the mobile device may communicate over a flexible bandwidth channel. A mobile device may receive adjustment information from a base station to adapt the chip rate of the mobile device. The mobile device may also receive flexible bandwidth waveforms over the flexible bandwidth channel.

Some embodiments may include determining a flexible bandwidth channel at a base station. The base station may transmit on a normal bandwidth channel and the flexible bandwidth channel simultaneously. The base station may also transmit adaptation information to a mobile device to inform the mobile device of how to adapt its chip rate to receive flexible bandwidth waveforms over the flexible bandwidth channel.

Some embodiments may utilize parts of spectrum that may not currently be used by operators because they are not big enough to fit a normal waveform. New channel numbers may be allowed to these portions of spectrum. Depending on the width of each portion of spectrum, a different chip rate may be assigned to the different portions of spectrum. Some embodiments may include a wireless device that can change the chip rate and/or scaling factor on the fly. Depending on the state of the wireless device, the device may camp on the available channel using the appropriate chip rate.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 may cover IS-2000, IS-95, IS-856 standards, and successor standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The mobile devices 115 may be any type of mobile station, mobile device, access terminal, subscriber unit, or user equipment. The mobile devices 115 may include cellular phones and wireless communications devices, but may also include personal digital assistants (PDAs), smartphones, other handheld devices, netbooks, notebook computers, etc. Thus, the term mobile device should be interpreted broadly hereinafter, including the claims, to include any type of wireless or mobile communications device.

The base stations 105 may wirelessly communicate with the mobile devices 115 via a base station antenna. The base stations 105 may be configured to communicate with the mobile devices 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-*a*, 110-*b*, or 110-*c*. The coverage area for a base station may be divided into sectors (not shown, but making up only a portion of the coverage area). The system 100 may include base stations 105 of different types (e.g., macro, micro, femto, and/or pico base stations). As used herein, the term "cell" may refer to 1) a sector, or 2) a site (e.g., a base station 105). Thus, the term "macrocell" may refer to 1) a macrocell sector, 2) a macrocell base station (e.g., macrocell base station 105), and/or 3) a macrocell controller. Thus, the term "femtocell" may refer to 1) a femtocell sector, or 2) a femtocell base station (e.g., femtocell access point).

For the discussion below, the mobile devices 115 may operate on (are "camped on") a macro or similar network facilitated by multiple base stations 105. Each base station 105 may cover a relatively large geographic area (e.g., hundreds of meters to several kilometers in radius) and may allow unrestricted access by terminals with service subscription. A portion of the mobile devices 115 may also be registered to operate (or otherwise allowed to operate) in femtocell coverage area (e.g., communicating with femtocell base station 105, which may be referred to as a femtocell access point (FAP) in some cases), within the coverage area of a macrocell base station 105.

By way of example, the femtocell base station 105 may be implemented as a Home NodeB ("HNB") or Home eNodeB (HeNB), and located in a user premises, such as a residence, an office building, etc. A macrocell base station may be implemented by a NodeB or eNodeB in some embodiments.

The different aspects of system 100, such as the mobile devices 115, the base stations 105, the core network 130, and/or the controller 120 may be configured to utilize flexible bandwidth and waveforms in accordance with various embodiments. System 100, for example, shows transmissions 125 between mobile devices 115 and base stations 105. The transmissions 125 may include uplink transmission, from a mobile device 115 to a base station 105, and/or downlink transmissions, from a base station 105 to a mobile device 115. The transmissions 125 may include flexible and/or normal waveforms. Normal waveforms may also be referred to as legacy and/or normal waveforms.

The different aspects of system 100, such as the mobile devices 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the mobile devices 115, the base stations 105, the core network 130, and/or the controller 120 may be configured to adapt the chip rates and/or scaling factors to generate and/or utilize flexible bandwidth and/or waveforms. In some cases, these devices may make these adaptations dynamically, to generate flexible waveforms to fit these portions of spectrum. Some aspects of system 100 may form a flexible subsystem (such as certain mobile devices 115 and/or base stations 105) that may be generated with respect to a normal subsystem (that may be implemented using other mobile devices 115 and/or base stations 105) through dilating, or scaling down, the time of the flexible subsystem with respect to the time of the normal subsystem.

Figure 2A:
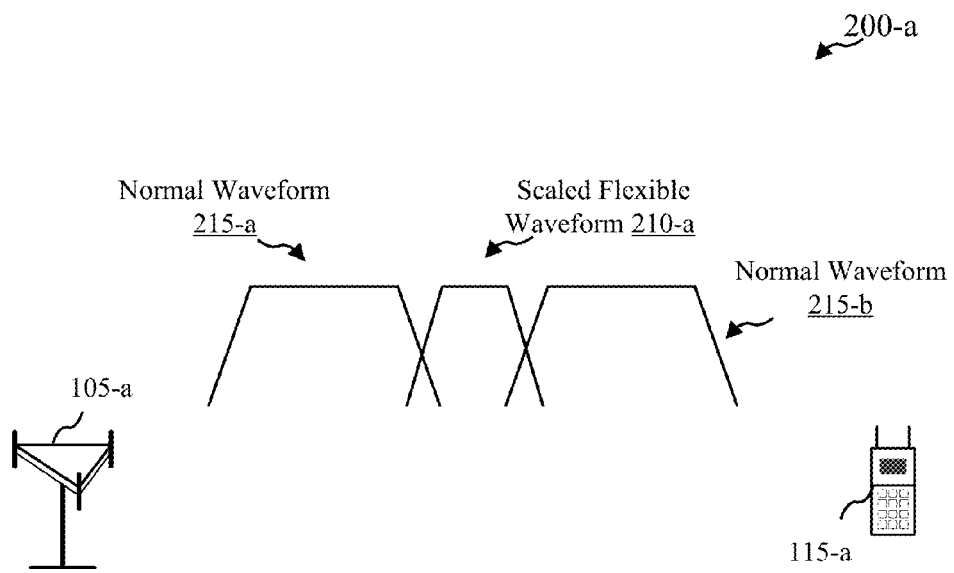
FIG. 2A shows an example of a wireless communications system where a flexible waveform fits into a portion of spectrum not broad enough to fit a normal waveform in accordance with various embodiments.
Figure 2B:
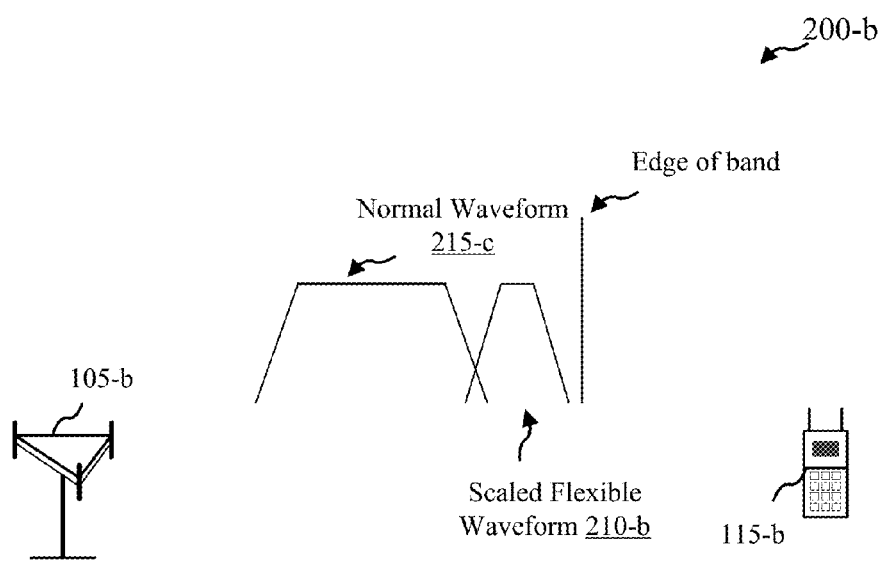
FIG. 2B shows an example of a wireless communications system where a flexible waveform fits into a portion of spectrum near an edge of a band in accordance with various embodiments.

As mentioned above, flexible subsystems may be utilized to generate flexible waveforms that occupy less bandwidth than a normal waveform. For example, at a band edge, there may not be enough available spectrum to place a normal waveform. For a flexible subsystem, as time gets dilated, the frequency occupied by a waveform goes down, thus making it possible to fit a flexible waveform into spectrum that may not be broad enough to fit a normal waveform. In some embodiments, flexible subsystems may also be utilized to generate additional PN offsets in order to provide additional base station identifiers. Scaling information may be utilized to perform measurements on the other subsystem, perform handoffs to the other subsystem, perform reselection, align, etc. FIG. 2A shows an example of a wireless communications system 200-a, which may be an example of system 100 of FIG. 1, with a base station 105-a and a mobile device 115-a, where a flexible waveform 210-a fits into a portion of spectrum not broad enough to fit a normal waveform, such as normal waveforms 215-a and/or 215-b. These waveforms may be part of one or more transmissions 125 as shown in FIG. 1, for example. FIG. 2B shows an example of a wireless communications system 200-b, which may be an example of system 100 of FIG. 1, with a base station 105-b and mobile device 115-b, where a flexible waveform 210-b that may fit into a portion of spectrum near an edge of a band, which may be a guard band, where a normal waveform such as waveform 215-c may not fit. These waveforms may be part of one or more transmissions 125 as shown in FIG. 1, for example.

Figure 2C:
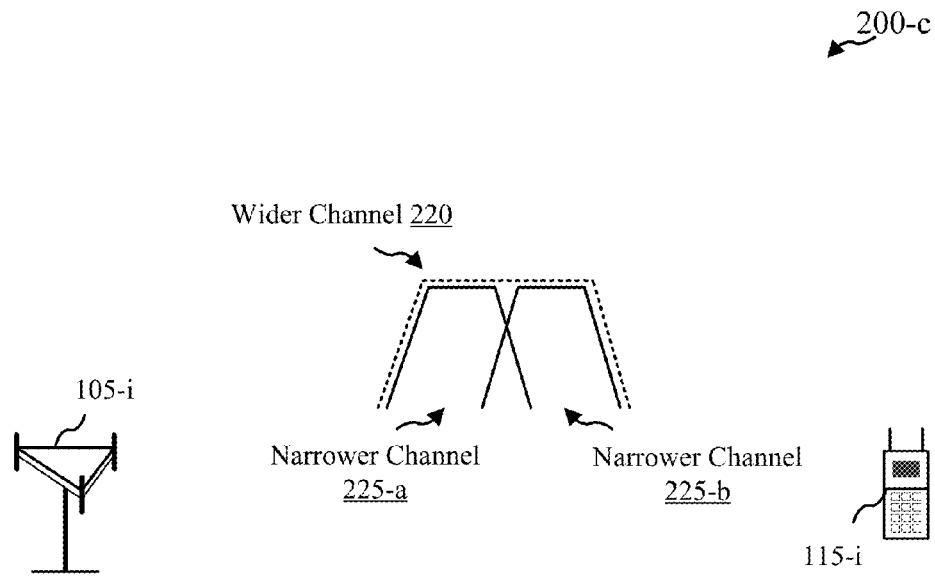
FIG. 2C shows an example of a wireless communications system where flexible bandwidth may be utilized to split existing frequency channels into multiple narrower frequency channels in accordance with various embodiments.
Figure 2D:
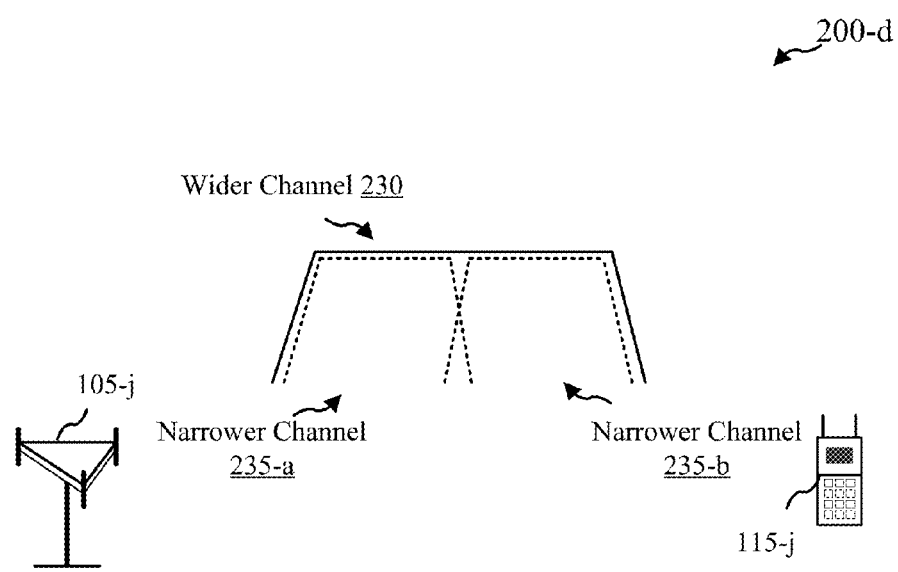
FIG. 2D shows an example of a wireless communications system where flexible bandwidth may be utilized to combine multiple frequency channels into one wider frequency channel in accordance with various embodiments.

In addition to using the flexible bandwidth to fit in smaller or bigger than normal channel bandwidths, flexible waveforms can be used to support splitting normal frequency channel into N narrower frequency channels to support more users and/or higher capacity. This may provide a very useful channel splitting and combing techniques to adapt channel bandwidth to traffic demand. Hence, instead of splitting the coverage area of a cell into smaller geographical areas to support more users, one can split the frequency channel into N narrower frequency channels each having the same coverage area but with lower peak data rates. This approach may not require more towers, more hardware and/or more additional backhaul connections. FIG. 2C shows an example of a wireless communications system 200-c, which may be an example of system 100 of FIG. 1, with a base station 105-i and mobile device 115-i, where a wider channel 220 may be split into two (or more) narrower channels 225-a/225-b. In some embodiments, the narrower channels 225 may be flexible bandwidth channels. In some cases, the wider channel 220 may be a normal bandwidth channel. Other configurations of normal and/or flexible bandwidth channels may also be utilized in some embodiments. Also, flexible bandwidth can be used to combine multiple frequency channels into one wider channel, which may support higher peak data rates for example. FIG. 2D shows an example of a wireless communications system 200-d, which may be an example of system 100 of FIG. 1, with a base station 105-j and mobile device 115-j, where two (or more) narrower channels 235-a/235-b may be combined to form a wider channel 230. In some embodiments, the narrower channels 235 may be normal bandwidth channels. In some cases, the wider channel 230 may be a flexible bandwidth channel. Other configurations of normal and/or flexible bandwidth channels may also be utilized in some embodiments, such as where the narrower channels 235 and the wider channel 230 are all flexible bandwidth channels, merely by way of example.

As discussed above, a flexible waveform may be a waveform that occupies less bandwidth than a normal waveform. Thus, in a flexible bandwidth system, the same number of symbols and bits may be transmitted over a longer duration compared to normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, ½, ¼, etc). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Some embodiments include systems, devices, and/or methods to provide adaptive flexible bandwidth. These embodiments may utilize parts of the licensed spectrum that may not currently be used by operators because they are not big enough to fit a full normal waveform. New channel numbers may be assigned to these portions of spectrum. Depending on the width of each portion of spectrum, a different chip rate, or scaling factor, may be assigned to the different portions of spectrum. Some embodiments may include a wireless device that can change the chip rate on the fly. Depending on the state of the wireless device, the device may camp on the available channel using the appropriate chip rate.

In some embodiments, a wireless device, such as the mobile devices 115 throughout this Application, may dynamically adapt its chip rate on the fly. The mobile device, for example, may be camped on a normal bandwidth channel. As it moves over to a flexible bandwidth channel, it may simultaneously adapt its chip rate such that the mobile device may communicate over the flexible bandwidth channel. In some embodiments, the mobile device may adapt its chip rate as it tunes from the normal bandwidth channel to the flexible bandwidth channel. This may involve the mobile device tuning from one center frequency to another center frequency. In some cases, the mobile device may also tune from one flexible bandwidth channel to another flexible bandwidth, or back to the normal bandwidth channel or another normal bandwidth channel as it adapts its chip rate accordingly. In some embodiments, rather than adapting its chip rate on the fly, a mobile device may first adapt its chip rate and then move over or tune to another channel, such as a flexible bandwidth channel or a normal bandwidth channel. In some embodiments, a mobile device may first move over or tune to another channel, such as a flexible bandwidth channel or normal bandwidth channel, and then adapt its chip rate. Adapting the chip rate of the mobile device, whether on the fly or not, may be done on an ad hoc basis in some embodiments.

Some embodiments may be configured to utilize portions of spectrum around the globe that may be under-utilized because they are not big enough to fit normal waveforms. Some embodiments provide systems, devices, and/or methods that may utilize these portions of spectrum in a way that may improve the overall spectral efficiency of existing services. Other embodiments may utilize portions of spectrum that are larger than may fit a normal waveform.

For example, flexible waveforms may be utilized to create a cdma2000 or WCDMA waveform that has flexible bandwidth relative to the normal waveform. This may be achieved through proportionally slowing the clock(s) in both the device side and the base station/NodeB side. For example, to create ½ waveform, the chip rate may be scaled down by a factor of 2; other factors may be utilized in some cases to create other flexible waveforms. Some or all of the clocks in the system may be scaled to achieve this effect.

Figure 3:
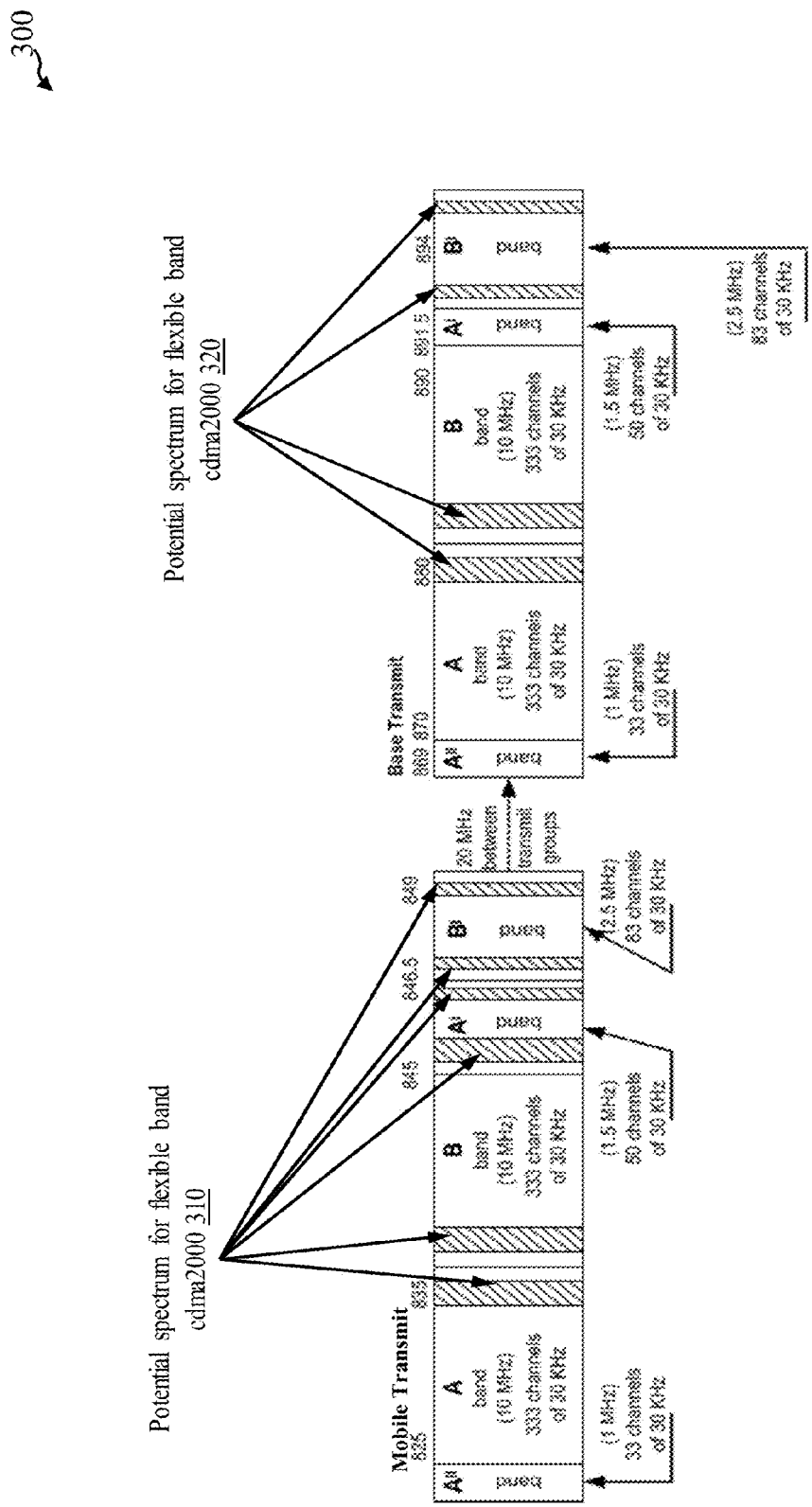
FIG. 3 shows an example of spectrum in which flexible bandwidth may be utilized in accordance with various embodiments.

FIG. 3 shows an example of where flexible bandwidth in accordance with various embodiments may be utilized. FIG. 3 depicts the 800 MHz spectrum (ref num. 300) in the US. There are empty portions of spectrum where flexible bandwidth cdma2000 could be utilized, including portions from mobile transmit band 310 and the base transmit band 320. Different possible scenarios could be implemented including, but not limited to, the following possible scenarios. For a CDMA cellular operator, the following channels utilizing flexible bandwidth could be utilized: ¼ (possibly ½) channel at channel #314 in sub-band A; ¼ (possibly ½) channel at channel #353 in sub-band B; ½ channel at channel #586 in sub-band A'; ¼ channel at channel #701 in sub-band A'; ¼ channel at channel #732 in sub-band B'; and/or ¼ channel at channel #784 in sub-band B'. This example shows a total of 5 additional channels, each ¼ wide and ½ channel or aggressively 3 channels ¼ wide and 3 channels ½ wide. For a CDMA PCS operator, the following channels utilizing flexible bandwidth could be utilized: ¼ channel at channel #9 in sub-band A; ¼ channel at channel #291 in sub-band A ¼ channel at channel #309 in sub-band D; ¼ channel at channel #391 in sub-band D; and/or repeat for sub-bands B, E, F and C. This may result in a total of 12 additional channels each ¼ wide. Other channels utilized could be used in other embodiments.

The use of flexible bandwidth may provide improved overall spectral efficiency. For example, sub-A band operators typically have deployed 8 channels for a total of 9.84 MHz. By adding the flexible channels, the overall spectral efficiency may be increased by an equivalent full channel (12.5%), for example. For sub-band B operators, the improvement may be 14.3% (7 currently used channels). For 5 MHz sub-band PCS operators, the improvement may be 16.7% and for 15 MHz sub-band PCS operator 4.5%.

In another example, flexible bandwidth may be utilized with UMTS. For example, between each two UMTS channels, there are 800 KHz typically available that could be used for flexible waveforms. These flexible channels could be used as a good differentiating feature femtocell deployment. Most of today's femtocells' or picocells' deployment problems may be related to spectrum sharing with macrocells. Having a dedicated spectrum for femtocells may solve these problems (e.g., interference, mobility management, range, capacity, etc). For example, an operator who owns 10 MHz of spectrum could deploy 2 UMTS channels occupying 8.4 MHz of spectrum with 1.6 MHz left as a guard band and one or more additional flexible channel.

Figure 4:
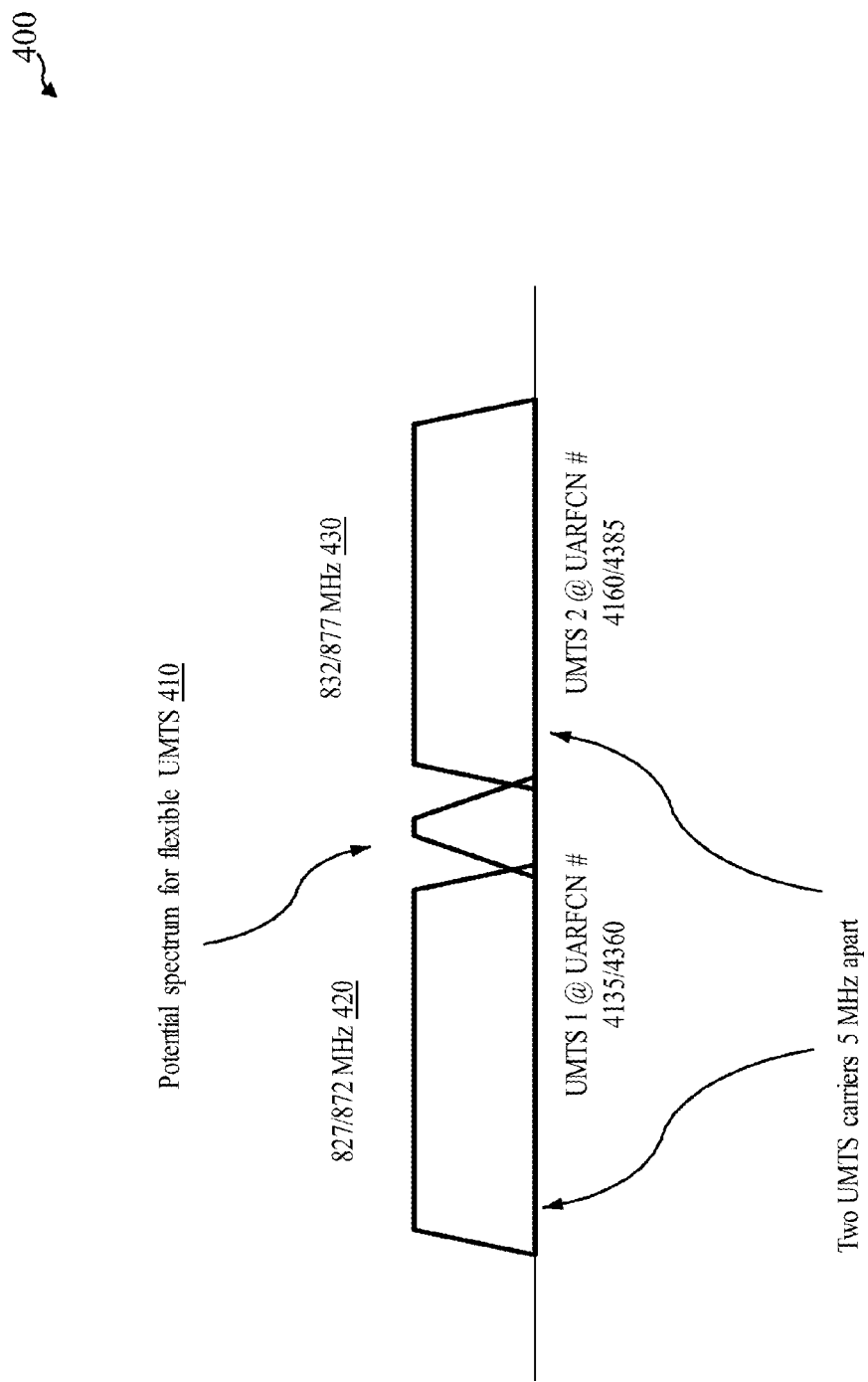
FIG. 4 shows an example of potential spectrum for flexible UMTS in accordance with various embodiments.

FIG. 4 shows an example of UMTS spectrum 400 where a potential flexible UMTS spectrum may be implemented. In standard mode of operation, a mobile device is capable of switching from the 827 MHz channel 420 to the 832 MHz channel 430 by tuning to the new frequency. However, switching to a flexible bandwidth 410 may require that the mobile device and the base station communicate on a flexible bandwidth spectrum.

Figure 5:
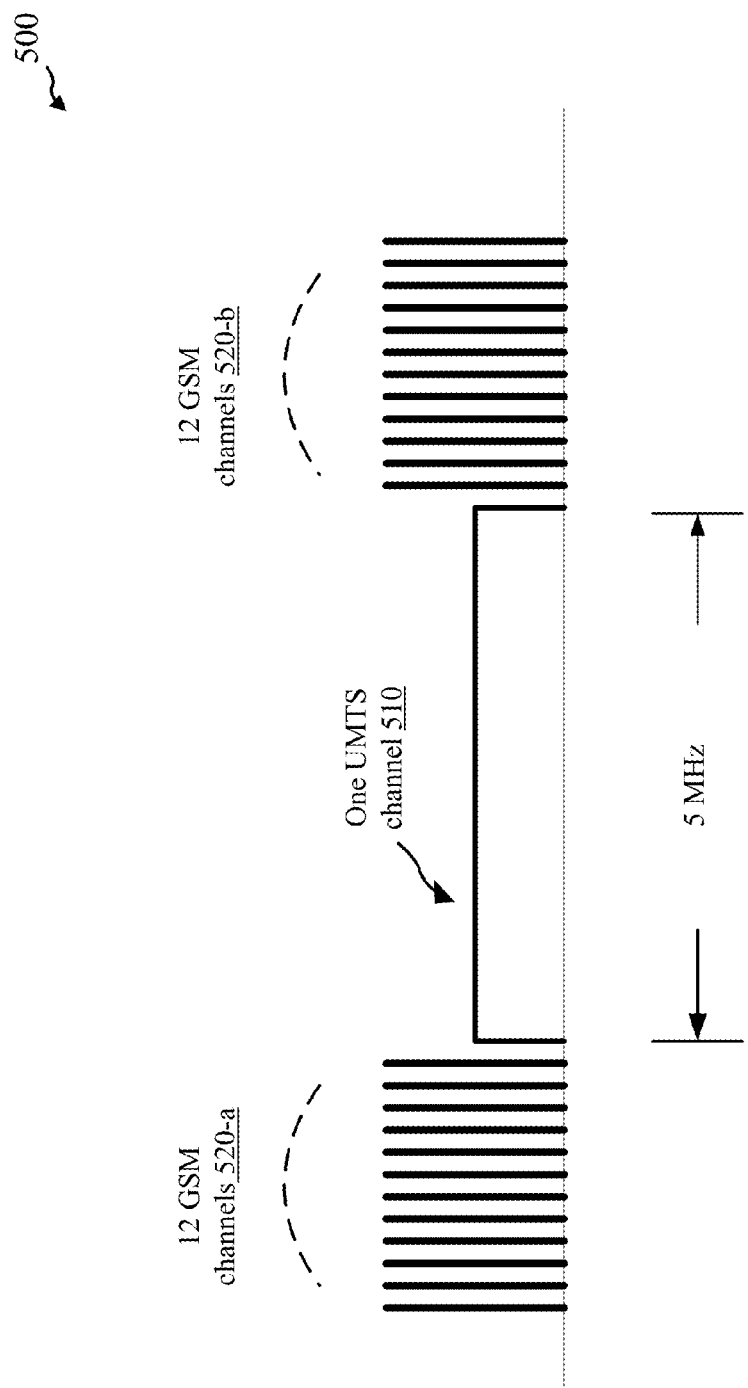
FIG. 5 shows an example of GSM reframing using standard UMTS.
Figure 6:
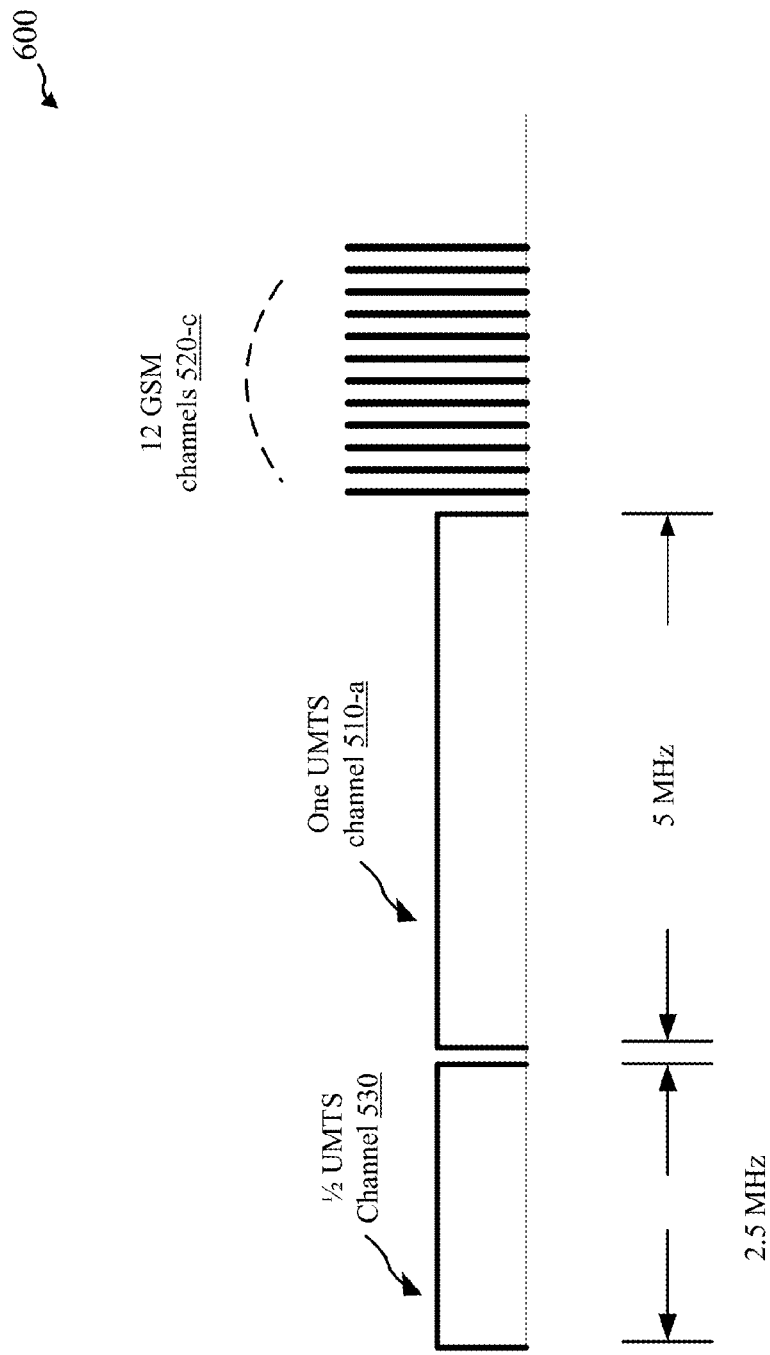
FIG. 6 shows an example of GSM reframing with flexible bandwidth in accordance with various embodiments.

Some embodiments may include re-framing some of GSM bands in some regions of the world. FIG. 5 shows an example GSM reframing 500 with the use of one UMTS channel 510. In the case of 10 MHz allocation, for example, an operator could deploy one UMTS channel 510 and may be forced to leave about 25 GSM channels (shown as two groups of 12 GSM channels 520-*a*/520-*b*;) to support legacy users. FIG. 6 shows an example of GSM reframing 600 using flexible bandwidth channels. The availability of flexible waveform may provide flexibility to add a flexible (½) channel 530 and still have 12 channels 520-*c* (along with one normal UTMS channel 510-*a*) to support legacy GSM users.

These portions of the spectrum may also be used as supplemental downlink channels for HSPA and/or EV-DO (e.g., Rev. B), for example. These portions of spectrum and other flexible bandwidth spectrum as discuss herein may also be utilized for small cells including, but not limited to, microcells, femtocells, and/or picocells. In some embodiments, flexible bandwidth spectrum may be utilized for uplink shared channel (USCH) spectrum for machine-to-machine and/or machine types of communication.

Some embodiments may utilize code division multiple access (CDMA) that may use unique spreading codes to spread the baseband data before transmission. Codes may take the form of one/zero sequence produced at a much higher rate than that of the baseband data. The rate of a spreading code may be referred to as chip signals. The chip rate may define the bandwidth of the signal. Deployed CDMA systems generally use a fixed chip rate. For example, cdma2000 uses a 1.2288 Mcps and WCDMA uses 3.884 Mcps. All the cells and/or sectors in the system may use the same chip rate.

By reducing the chip rate compared to the normal waveform chip rate, one can produce a reduced bandwidth waveform. Using the narrowband or flexible bandwidth improves overall spectral efficiency by allowing the operator to utilize currently un-used portions of the licensed spectrum, for example. In contrast, some embodiments may increase the chip rate compared to the normal waveform chip rate, thus producing an expanded bandwidth waveform.

A mobile device, such as mobile devices 115 of FIGS. 1 and/or 2, may be configured to operate in dual mode (normal and fractional). Upon receiving a request for service from mobile device and depending on the quality of service, the base station, such as base stations 105 of FIGS. 1 and/or 2, may determine that the mobile device can use a flexible bandwidth waveform. The base station may send the center frequency and the scaling factor for the flexible bandwidth to the mobile device.

Mobile devices and/or base stations, such as mobile devices 115 and/or base stations 105 of FIGS. 1 and/or 2 may be configured to operate in dual mode (normal and flexible). Upon receiving a request for service from a mobile device, for example, the base station may determine that the mobile device can use a flexible bandwidth waveform. The base station may send one or more center frequencies, scaling factors, or other chip rate adaptation information for the flexible bandwidth to the mobile device. The mobile device may tune to the new channel and utilize the scaling factor or other chip rate adaptation information accordingly to receive service. The mobile device may configure itself to communicate on the flexible bandwidth channel.

Figure 7:
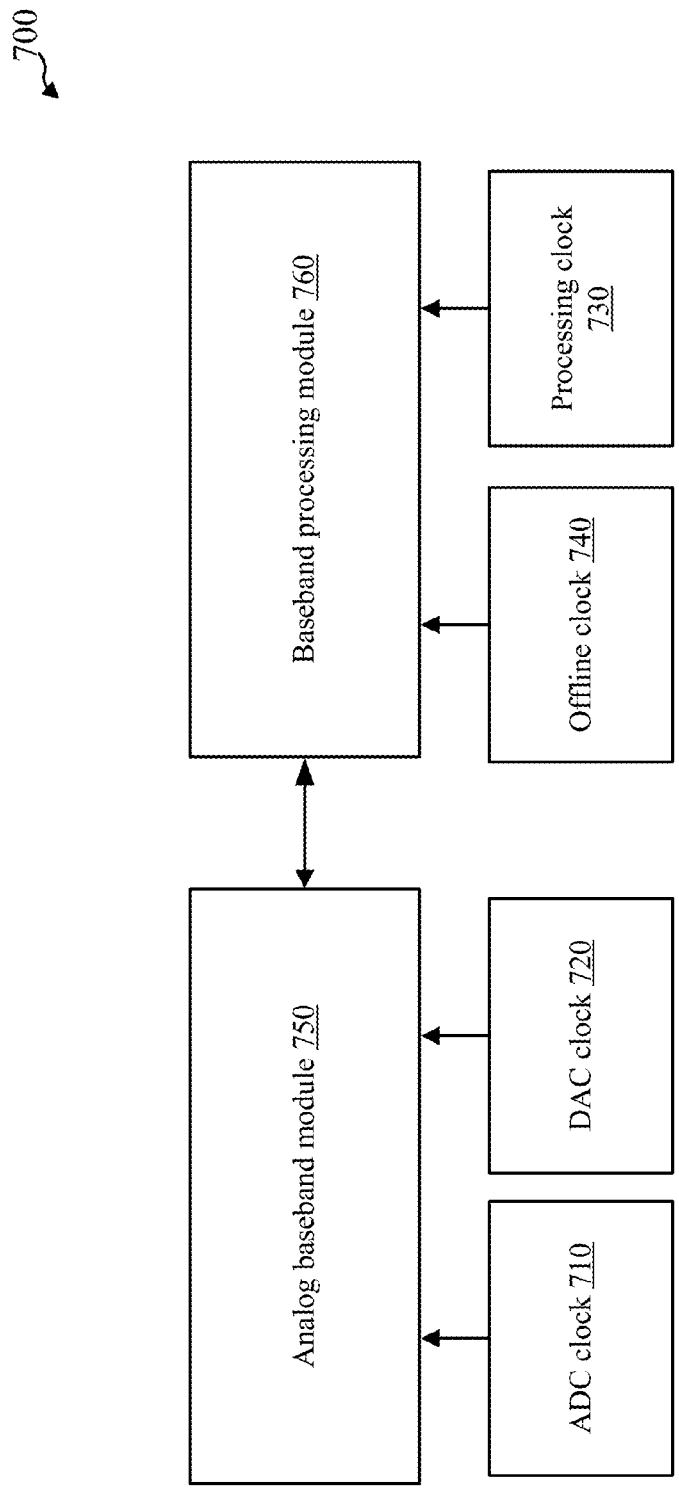
FIG. 7 shows an example of a systems clocks regime in accordance with various embodiments.

In some embodiments, a mobile device and/or base station may change the frequencies of the ADC clock 710, DAC clock 720, processing clock 730, and/or the offline clock 740 as shown in the systems clocks regime 700 in FIG. 7 to utilize flexible bandwidth waveforms. Systems clocks regime 700 also shows an analog baseband module 750 in communication with the ADC clock 710 and/or DAC clock 720. The analog baseband module 750 may be in communication with a baseband processing module 760 that may be in communication with the offline clock 740 and/or processing clock 730. These clocks 710-740 may control the block processing rate, interrupt rate, decimation rate, and/or interpolation rate, for example. In some embodiments, the offline clock 740 may not be changed. Some embodiments may not include an offline clock 740. Some implementations may include a processing clock 730. The processing clock 730 may not be in an offline mode. The processing clock 730 may be slowed down or not.

The base station may be simultaneously transmitting normal and flexible channels in some embodiments. The flexible channel may be generated by modifying the chip rate and could be of the same or different radio technology. Both channels may contain data and/or signaling. The signaling may be used to configure the mobile devices camped and/or attached to those channels. Signaling may also be used to manage the mobile device movement between the two channels.

In another embodiment, the base station may adapt the chip rate, hence the bandwidth of the transmitted waveform may change, depending on the requested quality of service, load and/or coverage of the adjacent cells in order to manage interference and maximum system resources.

The use of flexible bandwidth waveforms has many applications including, but not limited to, machine-to-machine, small cell deployment (Femto, Pico, Metro, etc.), roll out of 3G services over 2G spectrum (GSM re-framing), moderate data rate services, and/or voice services.

The use of flexible bandwidth may impact different parameters within a wireless communications systems. FIG. 8 shows a table 800 that shows some options to consider when assigning an RF channel with certain chip rate, where W is the bandwidth and N is scaling factor and n is the channel propagation constant. Table 800 includes for a normal waveform: bandwidth=W; data rate=R; transmit power=P; range=D; and capacity=C. Table 800 shows that for a flexible waveform for a macrocell, the same parameters change to the following: bandwidth=W/N; data rate=R/N; transmit power=P/N, range=D; and capacity=C. For a flexible waveform for a femtocell, the parameters change to the following: bandwidth=W/N/; data rate=R; transmit power=P/N, data rate=D; and capacity=C/N. A flexible waveform with extended range for a macrocell, the parameters change to the following: bandwidth =W/N; data rate=R/N; transmit power=P; range=D*N^(1/n); and capacity=C.

In addition to using the flexible bandwidth to fit in smaller or bigger than normal channel bandwidths, flexible waveforms can be used to support splitting normal frequency channel into N narrower frequency channels to support more users and/or higher capacity. This may provide a very useful channel splitting and combing techniques to adapt channel bandwidth to traffic demand. Hence, instead of splitting the coverage area of a cell into smaller geographical areas to support more users, one can split the frequency channel into N narrower frequency channels each having the same coverage area but with lower peak data rates. This approach may not require more towers, more hardware and/or more additional backhaul connections. Also, flexible bandwidth can be used to combine multiple frequency channels into one wider channel, which may support higher peak data rates.

Figure 9:
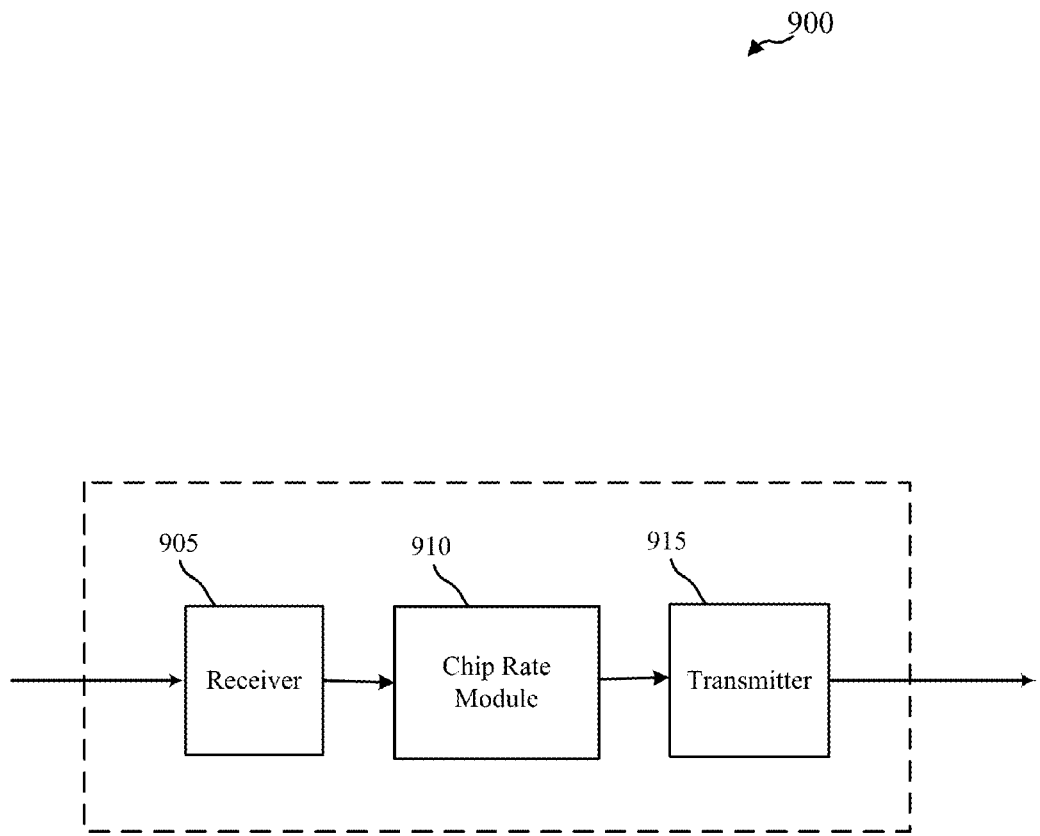
FIG. 9 shows a block diagram illustrating a device that includes adaptive flexible bandwidth functionality in accordance with various embodiments.

Turning next to FIG. 9, a block diagram illustrates a device 900 that includes adaptive flexible bandwidth functionality. The device 900 may be an example of the mobile device 115 of FIG. 1, FIG. 2A, FIG. 2B, FIG. 2C, FIG. 2D, FIG. 10, FIG. 11, and/or FIG. 12, and/or may be a device integrating the adaptive flexible bandwidth functionality (e.g., base station 105 of FIG. FIG. 1, FIG. 2A, FIG. 2B, FIG. 2C, FIG. 2D, FIG. 11, and/or FIG. 12). The device 900 may be an example of the systems clocks regime 700 of FIG. 7. The device 900 may also be a processor. The device 900 may include a receiver module 905, a chip rate module 910 and/or a transmitter module 915. Each of these components may be in communication with each other.

These components of the device 900 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 905 may receive information such as packet, data, and/or signaling information regarding what device 900 has received or transmitted. The received information may be utilized by the chip rate module 910 for a variety of purposes.

Device 900 and its modules 905, 910, and/or 915 may be configured in some embodiments for wireless communication utilizing flexible bandwidth. For example, in some embodiments, the chip rate module 910 may be configured to identify a chip rate of a mobile device. The chip rate module 910 may dynamically adapt the chip rate of the mobile device such that the mobile device communicates over a flexible bandwidth channel. The receiver module 905 may be configured to receive one or more flexible bandwidth waveforms over the flexible bandwidth channel.

Some embodiments of the chip rate module 910 may be further configured to receive adaptation information from a base station to adapt the chip rate of the mobile device dynamically. One or more center frequencies may be received to identify the flexible bandwidth channel. In some cases, one or more scaling factors may be received as part of the adaptation information.

In some embodiments, the chip rate module may be further configured to adapt the chip rate on the fly. Adapting the chip rate on the fly may include moving from a normal bandwidth channel to the flexible bandwidth channel as the mobile device adapts the chip rate. Adapting the chip rate on the fly may include tuning from a first center frequency to a second center frequency as the mobile device adapts the chip rate.

The chip rate module 910 may be configured to adapt the chip rate through adapting a frequency of processing of the mobile device. Adapting the chip rate by the chip rate module 910 may include adapting a frequency of at least one clock, wherein the at least one clock includes at least one of an ADC clock, a DAC clock, a processing clock, or an offline clock. Adapting the chip rate by the chip rate module 910 may include using a divider to change the frequency of the at least one clock. In some embodiments, the chip rate module 910 may adapt the chip rate using a divider to change the frequency of processing.

In some embodiments, device 900 may be configured to handle flexible bandwidth channels that may be smaller than a normal bandwidth channel in some cases. In other cases, the flexible bandwidth channel may be larger than a normal bandwidth channel. In some embodiments, device 900 may receive flexible bandwidth waveforms over the flexible bandwidth channel and normal bandwidth waveforms over a normal bandwidth channel; this may occur simultaneously in some cases. The transmitter module 915 may also transmit flexible bandwidth waveforms over the flexible bandwidth channel in some cases.

In some embodiments, device 900 may be configured as part of a base station configured to communicate with another device 900 that is part of the mobile device, where the two devices 900 communicate over a flexible bandwidth.

In some embodiments, device 900 may be configured as part of a base station, where the modules 905, 910, and/or 915 may be configured to determine a flexible bandwidth channel at a base station. Chip rate module 910 and/or transmitter module 915 may be configured to simultaneously transmit a normal bandwidth channel and the flexible bandwidth channel from the base station. In some embodiments, determining the flexible bandwidth channel includes adapting a chip rate in the base station.

Some embodiments of device 900 may further include transmitting, through transmitter module 915 from chip rate module 910, adaptation information from the base station to a mobile device to inform the mobile device of the adapted chip rate. One or more center frequencies may be transmitted from the base station to the mobile device to identify the flexible bandwidth channel.

Chip rate module 910 may be configured to adapt the chip rate through adapting a frequency of processing in the base station. Adapting the chip rate by the chip rate module 910 may include adapting a frequency of at least one clock, wherein the at least one clock includes at least one of an ADC, a DAC, a processing clock, or an offline clock. In some embodiments, device 900 may be configured such that the normal bandwidth channel and the flexible bandwidth channel utilize the same radio access technology. In some embodiments, they may utilize different radio access technologies.

In some embodiments, the chip rate module 910 may change the chip rate based on requested quality of service, load and/or coverage of adjacent cells. Device 900 may send a configuration message, through transmitter module 915, to inform a mobile device with the change. In some embodiments, device 900 may be configured, through chip rate module 910, receiver 905, and/or transmitter 915, to split a frequency channel into multiple narrower frequency channels. In some embodiments, device 900 may be configured, through chip rate module 910, receiver 905, and/or transmitter 915, to combine multiple frequency channels into a wider frequency channel. In some cases, this splitting and/or combining of frequency channels may utilize the adapted chip rate.

Figure 10:
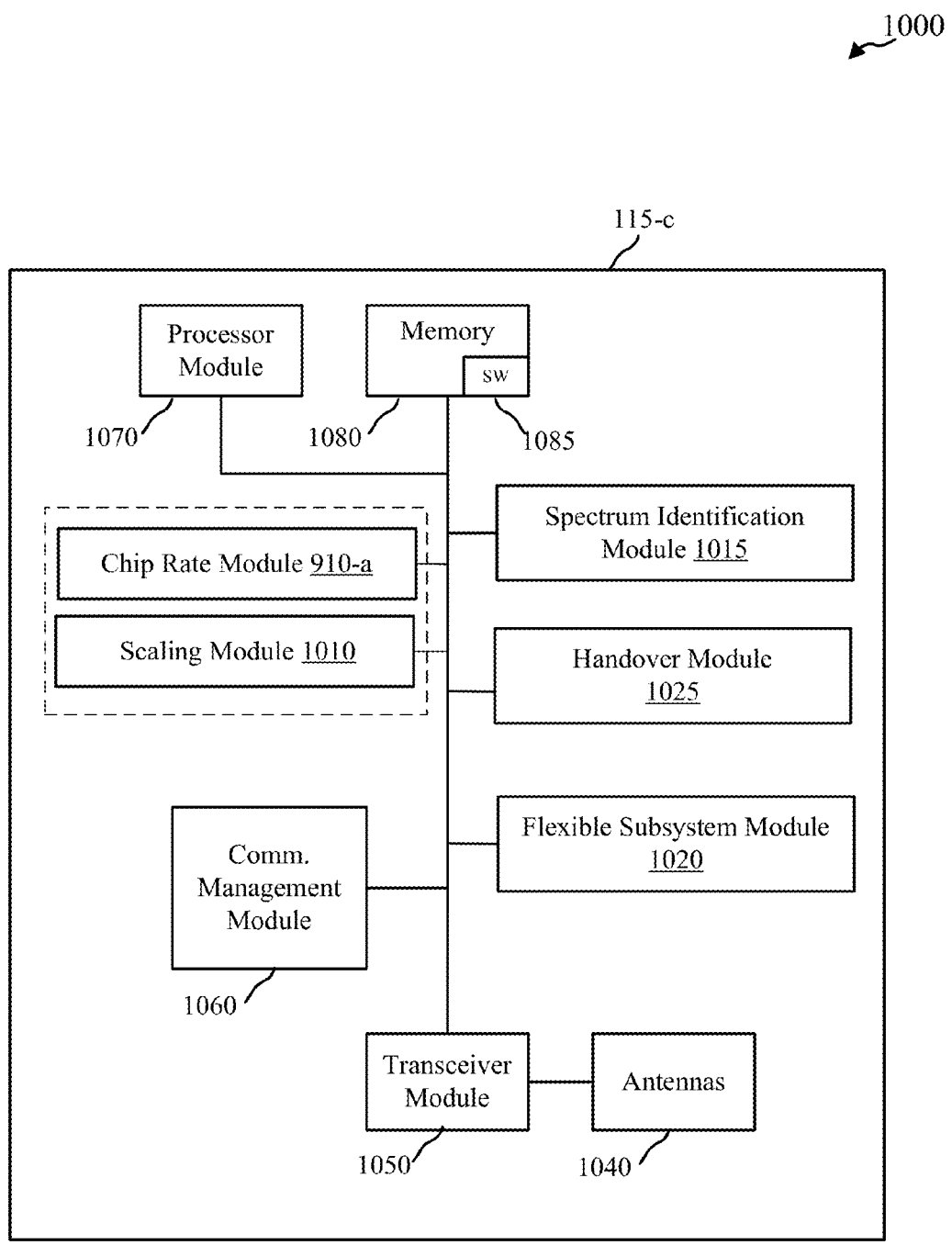
FIG. 10 is a block diagram of a mobile device configured to utilize flexible bandwidth in accordance with various embodiments.

FIG. 10 is a block diagram 1000 of a mobile device 115-*c* configured to utilize flexible bandwidth in accordance with various embodiments. The mobile device 115-*c* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*c* may have an internal power supply (not shown), such as a small battery, to facilitate mobile operation. In some embodiments, the mobile device 115-*c* may be the mobile device 115 of FIG. 1, FIG. 2A, FIG. 2B, FIG. 2C, FIG. 2D, FIG. 11, and/or FIG. 12 and/or the device 900 of FIG. 9. Mobile device 115-*c* may include aspects of the systems clocks regime 700 of FIG. 7. The mobile device 115-*c* may be a multi-mode mobile device. The mobile device 115-*c* may be referred to as a wireless communications device in some cases.

The mobile device 115-*c* may include antennas 1040, a transceiver module 1050, memory 1080, and a processor module 1070, which each may be in communication, directly or indirectly, with each other (e.g., via one or more buses). The transceiver module 1050 is configured to communicate bi-directionally, via the antennas 1040 and/or one or more wired or wireless links, with one or more networks, as described above. For example, the transceiver module 1050 may be configured to communicate bi-directionally with base stations 105 of FIG. 1, FIG. 2A, FIG. 2B, FIG. 2C, FIG. 2D, FIG. 11, and/or FIG. 12. The transceiver module 1050 may include a modem configured to modulate the packets and provide the modulated packets to the antennas 1040 for transmission, and to demodulate packets received from the antennas 1040. While the mobile device 115-*c* may include a single antenna, the mobile device 115-*c* will typically include multiple antennas 1040 for multiple links.

The memory 1080 may include random access memory (RAM) and read-only memory (ROM). The memory 1080 may store computer-readable, computer-executable software code 1085 containing instructions that are configured to, when executed, cause the processor module 1070 to perform various functions described herein (e.g., call processing, database management, message routing, etc.). Alternatively, the software code 1085 may not be directly executable by the processor module 1070 but be configured to cause the computer (e.g., when compiled and executed) to perform functions described herein.

The processor module 1070 may include an intelligent hardware device, e.g., a central processing unit (CPU) such as those made by Intel® Corporation or AMD®, a microcontroller, an application-specific integrated circuit (ASIC), etc. The processor module 1070 may include a speech encoder (not shown) configured to receive audio via a microphone, convert the audio into packets (e.g., 30 ms in length) representative of the received audio, provide the audio packets to the transceiver module 1050, and provide indications of whether a user is speaking Alternatively, an encoder may only provide packets to the transceiver module 1050, with the provision or withholding/suppression of the packet itself providing the indication of whether a user is speaking According to the architecture of FIG. 10, the mobile device 115-c may further include a communications management module 1060. The communications management module 1060 may manage communications with other mobile devices 115. By way of example, the communications management module 1060 may be a component of the mobile device 115-c in communication with some or all of the other components of the mobile device 115-c via a bus. Alternatively, functionality of the communications management module 1060 may be implemented as a component of the transceiver module 1050, as a computer program product, and/or as one or more controller elements of the processor module 1070.

The components for mobile device 115-c may be configured to implement aspects discussed above with respect to device 900 in FIG. 9 and may not be repeated here for the sake of brevity. For example, the chip rate module 910-a may be the chip rate module 910 of FIG. 9.

The mobile device 115-c may also include a spectrum identification module 1015. The spectrum identification module 1015 may be utilized to identify spectrum available for flexible waveforms. In some embodiments, a handover module 1025 may be utilized to perform handover procedures of the mobile device 115-c from one base station to another. For example, the handover module 1025 may perform a handover procedure of the mobile device 115-c from one base station to another where normal waveforms are utilized between the mobile device 115-c and one of the base stations and flexible waveforms are utilized between the mobile device and another base station. The mobile device 115-c may also include a scaling module 1010 that may be utilized to determine, generate, or otherwise create scaling factors that may be utilized to generate flexible waveforms. Scaling module 1010 may work in conjunction with chip rate module 910-a. The flexible subsystem module 1020 may be utilized to manage different aspects of the flexible waveforms.

In some embodiments, the transceiver module 1050, in conjunction with antennas 1040 along with other possible components of mobile device 115-c, may transmit information regarding flexible waveforms and/or scaling factors from the mobile device 115-c to base stations or a core network. In some embodiments, the transceiver module 1050 in conjunction with antennas 1040, along with other possible components of mobile device 115-c, may transmit information, such as flexible waveforms and/or scaling factors, to base stations or a core network such that these devices or systems may utilize flexible waveforms.

Figure 11:
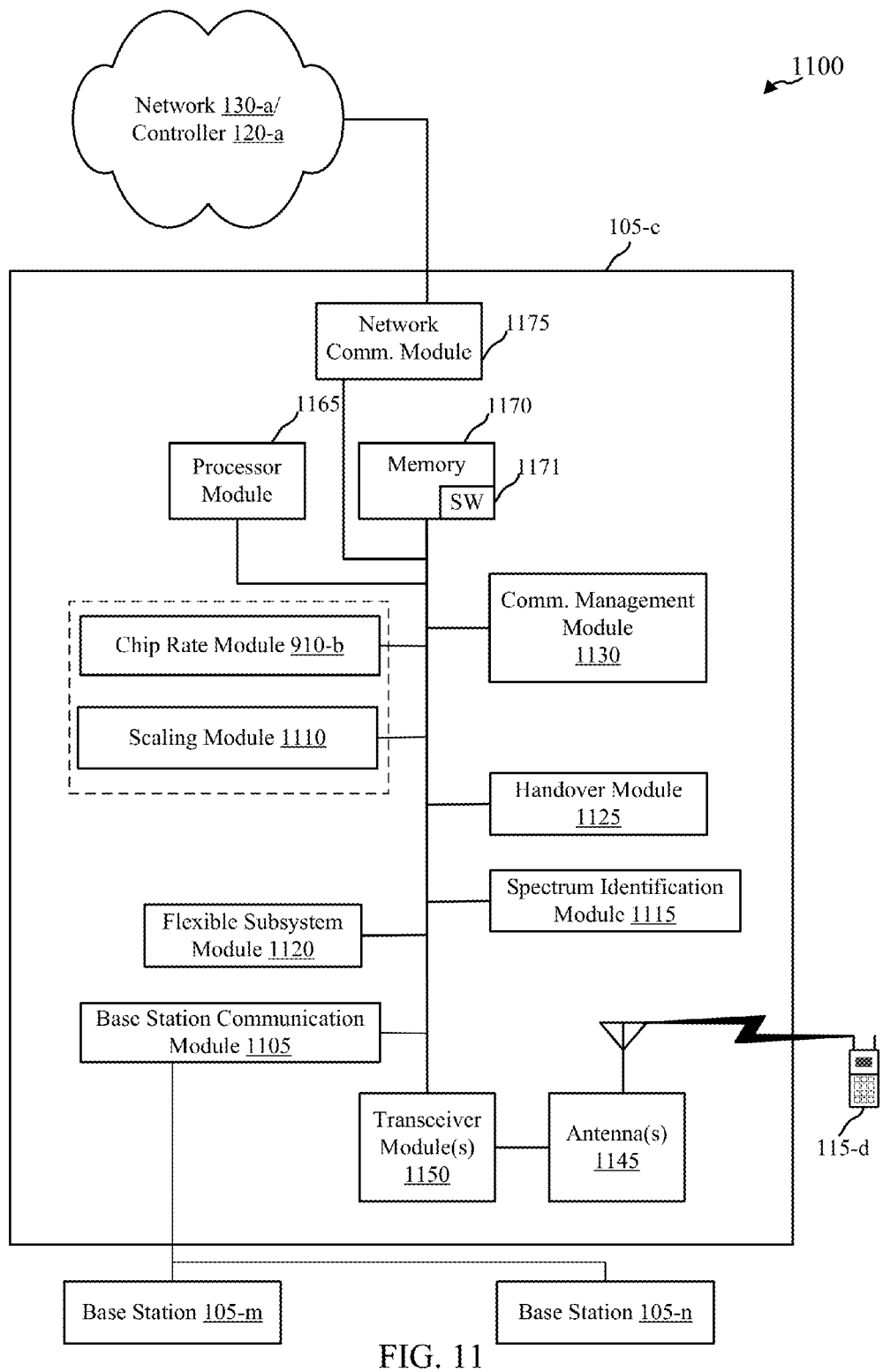
FIG. 11 shows a block diagram of a communications system that may be configured for utilizing flexible waveforms in accordance with various embodiments.

FIG. 11 shows a block diagram of a communications system 1100 that may be configured for utilizing flexible waveforms in accordance with various embodiments. This system 1100 may be an example of aspects of the system 100 depicted in FIG. 1, system 200-a of FIG. 2A, system 200-b of FIG. 2B, system 200-c of FIG. 2C, system 200-d of FIG. 2D, and/or system 1200 of FIG. 12. The base station 105-c may include antennas 1145, a transceiver module 1150, memory 1170, and a processor module 1165, which each may be in communication, directly or indirectly, with each other (e.g., over one or more buses). The transceiver module 1150 may be configured to communicate bi-directionally, via the antennas 1145, with the mobile device 115-d, which may be a multimode mobile device. The transceiver module 1050 (and/or other components of the base station 105-c) may also be configured to communicate bi-directionally with one or more networks. In some cases, the base station 105-c may communicate with the network 130-a and/or controller 120-a through network communications module 1175. Base station 105-c may be an example of an eNodeB base station, a Home eNodeB base station, a NodeB base station, and/or a Home NodeB base station. Controller 120-a may be integrated into base station 105-c in some cases, such as with an eNodeB base station.

Base station 105-c may also communicate with other base stations 105, such as base station 105-m and base station 105-n. Each of the base stations 105 may communicate with mobile device 115-d using different wireless communications technologies, such as different Radio Access Technologies. In some cases, base station 105-c may communicate with other base stations such as 105-m and/or 105-n utilizing base station communication module 1105. In some embodiments, base station communication module 1105 may provide an X2 interface within an LTE wireless communication technology to provide communication between some of the base stations 105. In some embodiments, base station 105-b may communicate with other base stations through controller 120-a and/or network 130-a.

The memory 1170 may include random access memory (RAM) and read-only memory (ROM). The memory 1170 may also store computer-readable, computer-executable software code 1171 containing instructions that are configured to, when executed, cause the processor module 1165 to perform various functions described herein (e.g., call processing, database management, message routing, etc.). Alternatively, the software code 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 30 ms in length) representative of the received audio, provide the audio packets to the transceiver module 1150, and provide indications of whether a user is speaking Alternatively, an encoder may only provide packets to the transceiver module 1150, with the provision or withholding/suppression of the packet itself providing the indication of whether a user is speaking The transceiver module 1150 may include a modem configured to modulate the packets and provide the modulated packets to the antennas 1145 for transmission, and to demodulate packets received from the antennas 1145. While some examples of the base station 105-b may include a single antenna 1145, the base station 105-*c* preferably includes multiple antennas 1145 for multiple links which may support carrier aggregation. For example, one or more links may be used to support macro communications with mobile device 115-*d*.

According to the architecture of FIG. 11, the base station 105-*c* may further include a communications management module 1130. The communications management module 1130 may manage communications with other base stations 105. By way of example, the communications management module 1130 may be a component of the base station 105-*c* in communication with some or all of the other components of the base station 105-*c* via a bus. Alternatively, functionality of the communications management module 1130 may be implemented as a component of the transceiver module 1150, as a computer program product, and/or as one or more controller elements of the processor module 1165.

The components for base station 105-*c* may be configured to implement aspects discussed above with respect to device 900 in FIG. 9 and may not be repeated here for the sake of brevity. For example, the chip rate module 910-*b* may be the chip rate module 910 of FIG. 9.

The base station 105-*c* may also include a spectrum identification module 1115. The spectrum identification module 1115 may be utilized to identify spectrum available for flexible waveforms. In some embodiments, a handover module 1125 may be utilized to perform handover procedures of the mobile device 115-*d* from one base station 105 to another. For example, the handover module 1125 may perform a handover procedure of the mobile device 115-*d* from base station 105-*c* to another where normal waveforms are utilized between the mobile device 115-*d* and one of the base stations and flexible waveforms are utilized between the mobile device and another base station. The base station 105-*c* may also include a scaling module 1110 that may be utilized to determine, generate, or otherwise create scaling factors that may be utilized to generate flexible waveforms. Scaling module 1110 may work in conjunction with chip rate module 910-*b*. The flexible subsystem module 1120 may be utilized to manage different aspects of the flexible waveforms.

In some embodiments, the transceiver module 1150 in conjunction with antennas 1145 along with other possible components of base station 105-*c* may transmit information regarding flexible waveforms and/or scaling factors from the base station 105-*c* to the mobile device 115-*d*, to other base stations 105-*m*/105-*n*, or core network 130-*a*. In some embodiments, the transceiver module 1150 in conjunction with antennas 1145, along with other possible components of base station 105-*c*, may transmit information to the mobile device 115-*d*, to other base stations 105-*m*/105-*n*, or core network 130-*a*, such as flexible waveforms and/or scaling factors, such that these devices or systems may utilize flexible waveforms.

Figure 12:
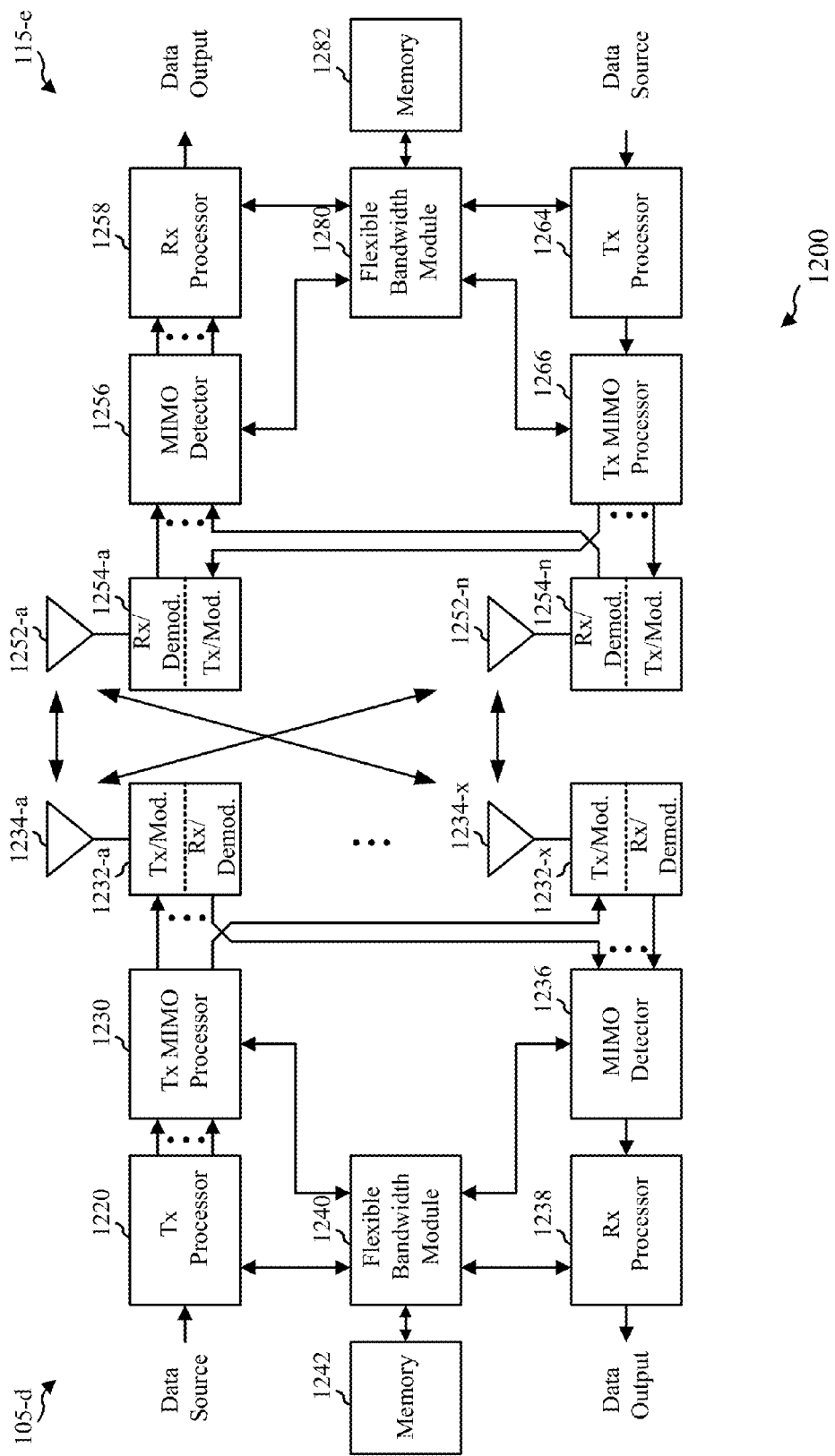
FIG. 12 shows a block diagram of a wireless communications system that includes a base station and a mobile device in accordance with various embodiments.

FIG. 12 is a block diagram of a system 1200 including a base station 105-*d* and a mobile device 115-*e* in accordance with various embodiments. This system 1200 may be an example of system 100 of FIG. 1, system 200-*a* of FIG. 2A, system 200-*b* of FIG. 2B, system 200-*c* of FIG. 2C, system 200-*d* of FIG. 2D, and/or the system 1100 of FIG. 11. The base station 105-*d* may be equipped with antennas 1234-*a* through 1334-*x*, and the mobile device 115-*e* may be equipped with antennas 1252-*a* through 1252-*n*. At the base station 105-*d*, a transmit processor 1220 may receive data from a data source.

The transmit processor 1220 may process the data. The transmit processor 1220 may also generate reference symbols, and a cell-specific reference signal. A transmit (TX) MIMO processor 1230 may perform spatial processing (e.g., precoding) on data symbols, control symbols, and/or reference symbols, if applicable, and may provide output symbol streams to the transmit modulators 1232-*a* through 1232-*x*. Each modulator 1232 may process a respective output symbol stream (e.g., for OFDM, etc.) to obtain an output sample stream. Each modulator 1232 may further process (e.g., convert to analog, amplify, filter, and upconvert) the output sample stream to obtain a downlink (DL) signal. In one example, DL signals from modulators 1232-*a* through 1232-*x* may be transmitted via the antennas 1234-*a* through 1234-*x*, respectively. The transmitter processor 1220 may receive information from a flexible bandwidth module 1240. The flexible bandwidth module 1240 may be configured to generate flexible waveforms through altering a chip rate and/or utilizing a scaling factor; this may be done dynamically in some cases. In some embodiments, the flexible bandwidth module 1240 may be implemented as part of a general processor, the transmitter processor 1220, and/or the receiver processor 1238. The flexible bandwidth module 1240 may be in communication with memory 1242.

The flexible bandwidth module 1250 may be configured to determine one or more flexible bandwidth channels at the base station 105-*d*. The flexible bandwidth module 1240 may work in conjunction with the transmitter processor 1220 to simultaneously transmit on normal bandwidth channel and the flexible bandwidth channel. In some embodiments, the transmitter processor 1220 in conjunction with the flexible bandwidth module 1240 may transmit adaptation information from the base station 105-*d* to a mobile device 115-*e* to inform the mobile device 115-*e* of the adapted chip rate. Adaptation information may include scaling factors that may be utilized to adapt a chip rate. One or more center frequencies may be transmitted from the base station to the mobile device 115-*e* to identify the flexible bandwidth channel.

At the mobile device 115-*e*, the mobile device antennas 1252-*a* through 1252-*n* may receive the DL signals from the base station 105-*d* and may provide the received signals to the demodulators 1254-*a* through 1254-*n*, respectively. Each demodulator 1254 may condition (e.g., filter, amplify, downconvert, and digitize) a respective received signal to obtain input samples. Each demodulator 1254 may further process the input samples (e.g., for OFDM, etc.) to obtain received symbols. A MIMO detector 1256 may obtain received symbols from all the demodulators 1254-*a* through 1254-*n*, perform MIMO detection on the received symbols if applicable, and provide detected symbols. A receiver processor 1258 may process (e.g., demodulate, deinterleave, and decode) the detected symbols, providing decoded data for the mobile device 115-*e* to a data output, and provide decoded control information to a flexible bandwidth module 1280, or memory 1282.

On the uplink (UL), at the mobile device 115-*e*, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the demodulators 1254-*a* through 1254-*n* (e.g., for SC-FDMA, etc.), and be transmitted to the base station 105-*d* in accordance with the transmission parameters received from the base station 105-*d*. The transmitter processor 1264 may also be configured to generate flexible waveforms through utilizing a scaling factor and/or adjusting a chip rate. The flexible bandwidth module processor 1280 may also be configured to generate and/or receive flexible waveforms through altering a chip rate and/or utilizing a scaling factor; this may be done dynamically in some cases. The transmit processor 1264 may receive information from flexible bandwidth module 1280. The flexible bandwidth module 1280 may identify a chip rate of the mobile device 115-*e*. The flexible bandwidth module 1280 may dynamically adapt the chip rate of the mobile device such that the mobile device communicates over a flexible bandwidth channel. The receiver processor 1258 may be configured to receive one or more flexible bandwidth waveforms over a flexible bandwidth channel.

The receiver processor 1258 and/or the flexible bandwidth module 1280 may be configured in some embodiments to receive adaptation information from base station 105-*d* to adapt the chip rate of the mobile device 115-*e* dynamically. One or more center frequencies may be received to identify the flexible bandwidth channel. In some cases, one or more scaling factors may be received as part of the adaptation information.

At the base station 105-*d*, the UL signals from the mobile device 115-*e* may be received by the antennas 1234, processed by the demodulators 1232, detected by a MIMO detector 1236 if applicable, and further processed by a receive processor. The receive processor 1238 may provide decoded data to a data output and to the flexible bandwidth module 1280. In some embodiments, the flexible bandwidth module 1280 may be implemented as part of a general processor, the transmitter processor 1264, and/or the receiver processor 1258.

Figure 13A:
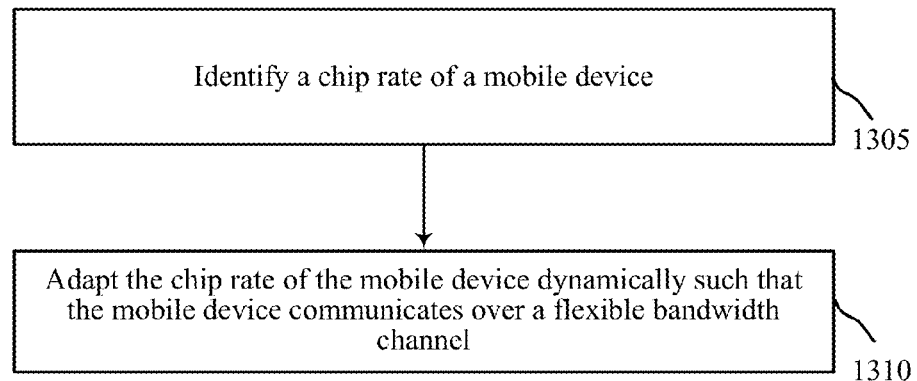
FIG. 13A shows a flow diagram of a method for wireless communication in accordance with various embodiments.

Turning to FIG. 13A, a flow diagram of a method 1300-*a* for wireless communication is provided. Method 1300-*a* may be implemented utilizing various wireless communications devices including, but not limited to: a mobile device 115 as seen in FIG. 1, FIG. 2A, FIG. 2B, FIG. 2C, FIG. 2D, FIG. 10, FIG. 11 and/or FIG. 12; a base station 105 as seen in FIG. 1, FIG. 2A, FIG. 2B, FIG. 2C, FIG. 2D, FIG. FIG. 11 and/or FIG. 12; a core network 130 or controller 120 as seen in FIG. 1 and/or FIG. 11; a systems clocks regime 700 of FIG. 7, and/or a device 900 of FIG. 9.

At block 1305, a chip rate of a mobile device may be identified. At block 1310, the chip rate of the mobile device may be adapted dynamically such that the mobile device communicates over a flexible bandwidth channel. One or more flexible bandwidth waveforms may be received over the flexible bandwidth channel.

Some embodiments of method 1300 may further include receiving adaptation information from a base station to adapt the chip rate of the mobile device dynamically. One or more center frequencies may be received to identify the flexible bandwidth channel. In some cases, one or more scaling factors may be received as part of the adaptation information.

Some embodiments of method 1300 may include adapting the chip rate on the fly. Adapting the chip rate on the fly may include moving from a normal bandwidth channel to the flexible bandwidth channel as the mobile device adapts the chip rate. Adapting the chip rate on the fly may include tuning from a first center frequency to a second center frequency as the mobile device adapts the chip rate.

Adapting the chip rate may include adapting a frequency of processing of the mobile device. Adapting the frequency of processing may include adapting at least an interrupt rate, a decimation rate, or an interpolation rate.

Adapting the chip rate may include adapting a frequency of at least one clock, wherein the at least one clock includes at least one of an ADC clock, a DAC clock, a processing clock, or an offline clock. Adapting the chip rate may include using a divider to change the frequency of the at least one clock. In some embodiments, adapting the chip rate may involve using a divider to change a frequency of processing.

The flexible bandwidth channel may be smaller than a normal bandwidth channel in some cases. In other cases, the flexible bandwidth channel may be larger than a normal bandwidth channel. In some embodiments, the mobile device may receive flexible bandwidth waveforms over the flexible bandwidth channel and normal bandwidth waveforms over a normal bandwidth channel; this may occur simultaneously in some cases. The mobile device may also transmit flexible bandwidth waveforms over one or more flexible bandwidth channels in some cases. Some embodiments may include splitting a frequency channel into multiple narrower frequency channels utilizing the adapted chip rate. Some embodiments may include combining multiple frequency channels into a wider frequency channel utilizing the adapted chip rate.

Figure 13B:
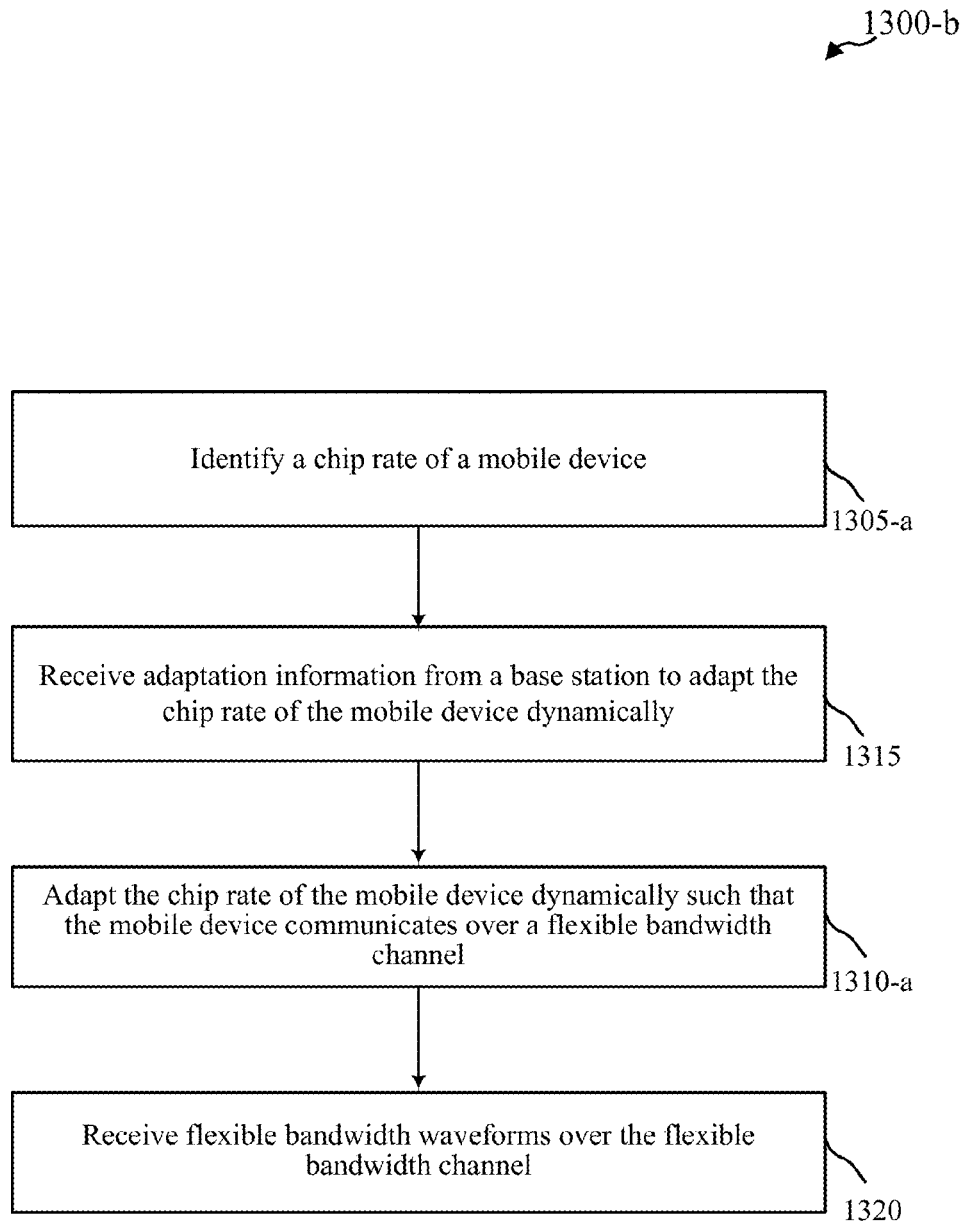
FIG. 13B shows a flow diagram of a method for wireless communication in accordance with various embodiments.

Turning to FIG. 13B, a flow diagram of a method 1300-*b* for wireless communication is provided. Method 1300-*b* may be implemented utilizing various wireless communications devices including, but not limited to: a mobile device 115 as seen in FIG. 1, FIG. 2A, FIG. 2B, FIG. 2C, FIG. 2D, FIG. 10, FIG. 11 and/or FIG. 12; a base station 105 as seen in FIG. 1, FIG. 2A, FIG. 2B, FIG. 2C, FIG. 2D, FIG. FIG. 11 and/or FIG. 12; a core network 130 or controller 120 as seen in FIG. 1 and/or FIG. 11; a systems clocks regime 700 of FIG. 7, and/or a device 900 of FIG. 9. Method 1300-*b* may be an example of method 1300-*a*.

At block 1305-*a*, a chip rate of a mobile device may be identified. At block 1315, adaptation information may be received from a base station to adapt the chip rate of the mobile device dynamically. At block 1310-*a*, the chip rate of the mobile device may be adapted dynamically such that the mobile device communicates over a flexible bandwidth channel. At block 1320, one or more flexible bandwidth waveforms may be received over the flexible bandwidth channel.

Figure 14A:
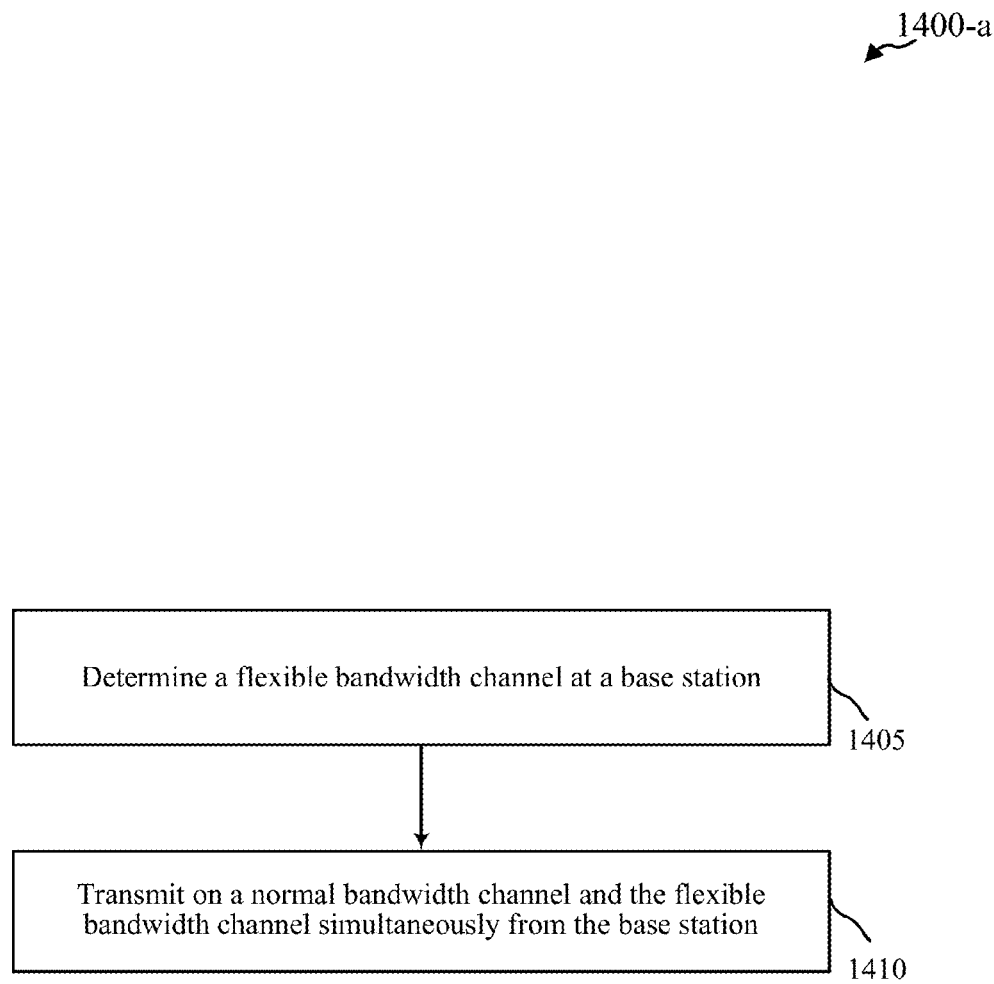
FIG. 14A shows a flow diagram of a method for wireless communication in accordance with various embodiments.

Turning to FIG. 14A, a flow diagram of a method 1400-*a* for wireless communication is provided. Method 1400-*a* may be implemented utilizing various wireless communications devices including, but not limited, to: a mobile device 115 as seen in FIG. 1, FIG. 2A, FIG. 2B, FIG. 2C, FIG. 2D, FIG. 10, FIG. 11 and/or FIG. 12; a base station 105 as seen in FIG. 1, FIG. 2A, FIG. 2B, FIG. 2C, FIG. 2D, FIG. FIG. 11 and/or FIG. 12; a core network 130 or controller 120 as seen in FIG. 1 and/or FIG. 11; a systems clocks regime 700 of FIG. 7, and/or a device 900 of FIG. 9.

At block 1405, a flexible bandwidth channel may be determined at a base station. At block 1410, a normal bandwidth channel and the flexible bandwidth channel may be transmitted on simultaneously from the base station. In some embodiments, determining the flexible bandwidth channel includes adapting a chip rate in the base station.

Some embodiments of method 1400 may further include transmitting adaptation information from the base station to a mobile device to inform the mobile device of the adapted chip rate. Adaptation information may include scaling factors that may be utilized to adapt a chip rate. One or more center frequencies may be transmitted from the base station to the mobile device to identify the flexible bandwidth channel.

Adapting the chip rate may include adapting a frequency of processing in the base station. Adapting the chip rate may include adapting a frequency of at least one clock, wherein the at least one clock includes at least one of an ADC, a DAC, a processing clock, or an offline clock.

In some embodiments, the normal bandwidth channel and the flexible bandwidth channel utilize the same radio access technology. In some embodiments, they may utilize different radio access technologies. In some embodiments, the base station adapts the chip rate based on requested quality of service, load and/or coverage of adjacent cells; the base station may determine requested quality of service, load and/or coverage information to make such an adaptation to the chip rate. In some embodiments, the base station sends a configuration message to inform a mobile device of the change. Some embodiments may include splitting a frequency channel into multiple narrower frequency channels. Some embodiments may include combining multiple frequency channels into a wider frequency channel.

Figure 14B:
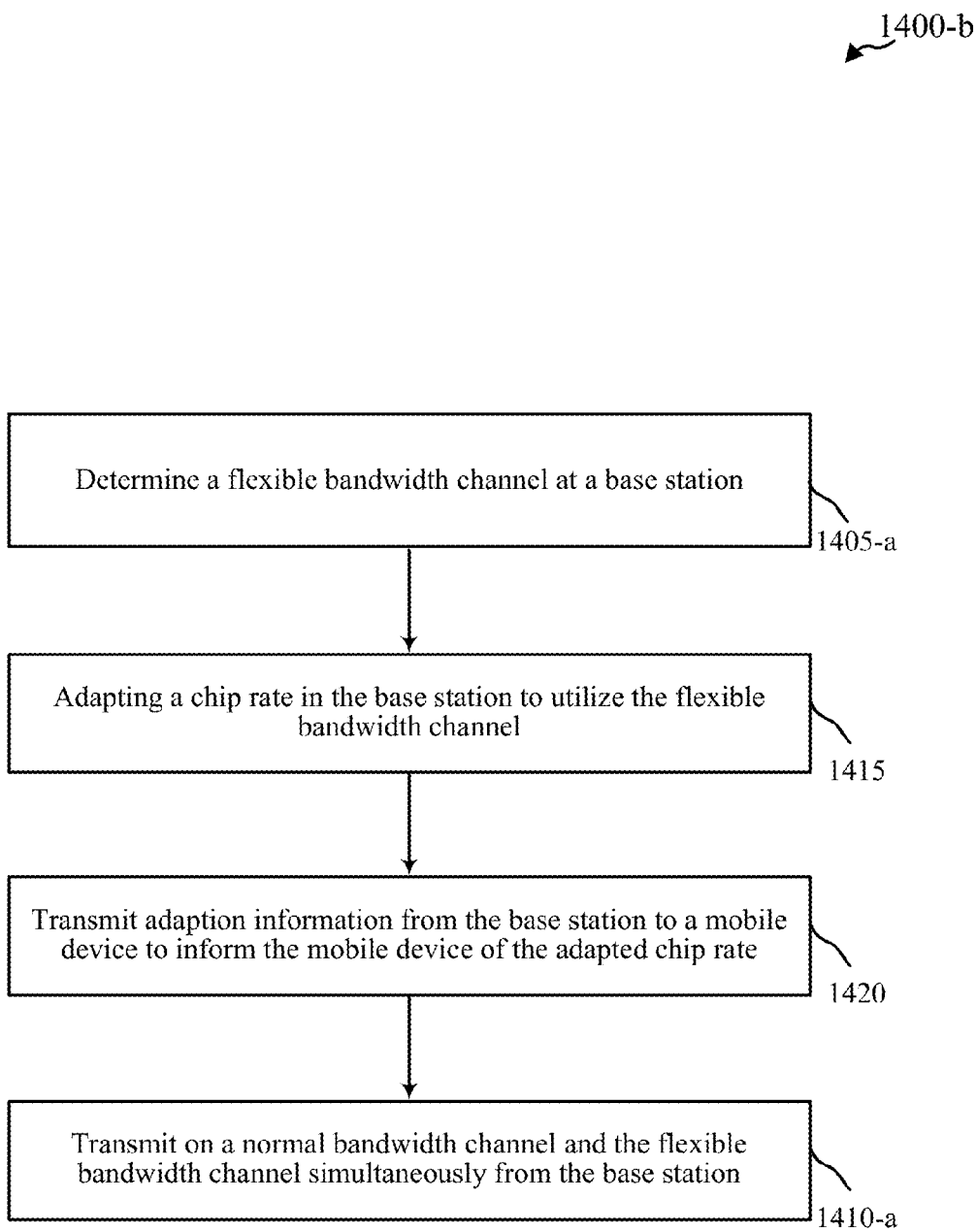
FIG. 14B shows a flow diagram of a method for wireless communication in accordance with various embodiments.

Turning to FIG. 14B, a flow diagram of a method 1400-*b* for wireless communication is provided. Method 1400-*b* may be implemented utilizing various wireless communications devices including, but not limited to: a mobile device 115 as seen in FIG. 1, FIG. 2A, FIG. 2B, FIG. 2C, FIG. 2D, FIG. 10, FIG. 11 and/or FIG. 12; a base station 105 as seen in FIG. 1, FIG. 2A, FIG. 2B, FIG. 2C, FIG. 2D, FIG. FIG. 11 and/or FIG. 12; a core network 130 or controller 120 as seen in FIG. 1 and/or FIG. 11; a systems clocks regime 700 of FIG. 7, and/or a device 900 of FIG. 9. Method 1400-*b* may be an example and/or utilize aspects of method 1400-*a* of FIG. 14A.

At block 1405-*a*, a flexible bandwidth channel may be determined at a base station. At block 1415, a chip rate in the base station may be adapted to utilize the flexible bandwidth channel. At block 1420, adaptation information may be transmitted from the base station to a mobile device to inform the mobile device of the adapted chip rate. At block 1410-*a*, a normal bandwidth channel and the flexible bandwidth channel may be transmitted on simultaneously from the base station. In some embodiments, determining the flexible bandwidth channel includes adapting a chip rate in the base station.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication in a code division multiple access system, comprising:
identifying a chip rate of a mobile device for a normal bandwidth code division multiple access channel;
identifying spectrum to be used for a flexible bandwidth code division multiple access channel separate from spectrum occupied by the normal bandwidth channel, the identified spectrum comprising spectrum determined to be available for use for the flexible bandwidth channel;
determining a chip rate for the flexible bandwidth channel based at least in part on the available spectrum to be used for the flexible bandwidth channel;
adapting the chip rate of the mobile device dynamically utilizing a scaling factor, the adaptation from the chip rate for the normal bandwidth channel to the chip rate for the flexible bandwidth channel; and
transmitting over the flexible bandwidth channel on the available spectrum utilizing the chip rate for the flexible bandwidth channel.

2. The method of claim 1, further comprising:
receiving adaptation information from a base station to adapt the chip rate of the mobile device dynamically.

3. The method of claim 2, further comprising:
receiving one or more center frequencies to identify the flexible bandwidth channel.

4. The method of claim 1, wherein adapting the chip rate includes adapting the chip rate on the fly.

5. The method of claim 4, wherein adapting the chip rate on the fly comprises:
moving from the normal bandwidth channel to the flexible bandwidth channel as the mobile device adapts the chip rate.

6. The method of claim 4, wherein adapting the chip rate on the fly comprises:
tuning from a first center frequency to a second center frequency as the mobile device adapts the chip rate.

7. The method of claim 1, wherein adapting the chip rate includes adapting a frequency of processing of the mobile device.

8. The method of claim 7, wherein adapting the chip rate includes using a divider to change the frequency of processing.

9. The method of claim 1, wherein adapting the chip rate includes adapting a frequency of at least one clock, wherein the at least one clock includes at least one of an Analog-to-Digital Conversion (ADC) clock, a Digital-to-Analog Conversion (DAC) clock, a processing clock, or an offline clock.

10. The method of claim 9, wherein adapting the chip rate includes using a divider to change the frequency of the at least one clock.

11. The method of claim 1, wherein the flexible bandwidth channel is smaller than the normal bandwidth channel.

12. The method of claim 1, wherein the flexible bandwidth channel is larger than the normal bandwidth channel.

13. The method of claim 1, further comprising:
splitting a frequency channel into a plurality of narrower frequency channels utilizing the adapted chip rate.

14. The method of claim 1, further comprising:
combining a plurality of frequency channels into a wider frequency channel utilizing the adapted chip rate.

15. The method of claim 1, further comprising:
receiving an indication of the spectrum to be used for the flexible bandwidth code division multiple access channel from a base station.

16. The method of claim 1, wherein the spectrum to be used for a flexible bandwidth code division multiple access channel comprises a portion of a band of un-used spectrum.

17. The method of claim 1, wherein the code division multiple access system comprises a CDMA system, a Wideband CDMA (WCDMA) system, or Universal Mobile Telecommunication System (UMTS).

18. A method for wireless communication in a code division multiple access system, comprising:
determining a chip rate at a base station for a normal bandwidth code division multiple access channel;
identifying available spectrum to be used for a flexible bandwidth code division multiple access channel separate from spectrum occupied by the normal bandwidth channel;
determining a chip rate for the flexible bandwidth channel based at least in part on the available spectrum to be used for the flexible bandwidth channel;
configuring the flexible bandwidth channel over the available spectrum to utilize the chip rate for the flexible bandwidth channel;
transmitting a first waveform on the normal bandwidth channel utilizing the chip rate for the normal bandwidth channel; and
transmitting, concurrently with the transmission of the first waveform, a second waveform on the flexible bandwidth channel utilizing the chip rate for the flexible bandwidth channel.

19. The method of claim 18, further comprising:
transmitting configuration information from the base station to a mobile device to inform the mobile device of the chip rate for the flexible bandwidth channel.

20. The method of claim 19, further comprising:
transmitting one or more center frequencies from the base station to the mobile device to identify the flexible bandwidth channel.

21. The method of claim 18, wherein configuring the flexible bandwidth channel over the available spectrum includes adapting a frequency of processing in the base station.

22. The method of claim 18, wherein configuring the flexible bandwidth channel over the available spectrum includes adapting a frequency of at least one clock, wherein the at least one clock includes at least one of an Analog-to-Digital Conversion (ADC) clock, a Digital-to-Analog Conversion (DAC) clock, a processing clock, or an offline clock.

23. The method of claim, 18, wherein the normal bandwidth channel and the flexible bandwidth channel utilize the same radio access technology.

24. The method of claim 18, wherein configuring the flexible bandwidth channel over the available spectrum is based on a requested quality of service.

25. The method of claim 18, wherein configuring the flexible bandwidth channel over the available spectrum is based on a load.

26. The method of claim 18, wherein configuring the flexible bandwidth channel over the available spectrum is based on a coverage of one or more adjacent cells.

27. The method of claim 18, further comprising:
splitting a frequency channel into a plurality of narrower frequency channels.

28. The method of claim 18, further comprising:
combining a plurality of frequency channels into a wider frequency channel.

29. The method of claim 18, wherein the available spectrum to be used for a flexible bandwidth code division multiple access channel comprises a portion of a band of un-used spectrum.

30. The method of claim 18, wherein the code division multiple access system comprises a CDMA system, a Wideband CDMA (WCDMA) system, or Universal Mobile Telecommunication System (UMTS).

31. A code division multiple access communications system configured for utilizing flexible bandwidth channels, the code division multiple access communications system comprising:

a means for identifying a chip rate of a mobile device for a normal bandwidth code division multiple access channel;
a means for identifying spectrum to be used for a flexible bandwidth code division multiple access channel separate from spectrum occupied by the normal bandwidth channel, the identified spectrum comprising spectrum determined to be available for use for the flexible bandwidth channel;
a means for determining a chip rate for the flexible bandwidth channel based at least in part on the available spectrum to be used for the flexible bandwidth channel;
a means for adapting the chip rate of the mobile device dynamically utilizing a scaling factor, the adaptation from the chip rate for the normal bandwidth channel to the chip rate for the flexible bandwidth channel; and
a means for transmitting over the flexible bandwidth channel on the available spectrum utilizing the chip rate for the flexible bandwidth channel.

32. The wireless communications system of claim 31, further comprising:
a means for receiving adaptation information from a base station to adapt the chip rate of the mobile device dynamically.

33. The wireless communications system of claim 31, further comprising:
a means for adapting the chip rate of the mobile device on the fly.

34. The wireless communications system of claim 32, further comprising:
a means for receiving one or more center frequencies to identify the flexible bandwidth channel.

35. The wireless communications system of claim 31, further comprising:
a means for receiving one or more flexible bandwidth waveforms over the flexible bandwidth channel.

36. The wireless communications system of claim 31, wherein adapting the chip rate includes adapting a frequency of processing of the mobile device, a frequency of at least one clock, wherein the at least one clock includes at least one of an Analog-to-Digital Conversion (ADC) clock, a Digital-to-Analog Conversion (DAC) clock, a processing clock, or an offline clock.

37. The wireless communications system of claim 31, further comprising:
a means to split a frequency channel into a plurality of narrower frequency channels utilizing the adapted chip rate.

38. The wireless communications system of claim 31, further comprising:
a means for combining a plurality of frequency channels into a wider frequency channel utilizing the adapted chip rate.

39. A computer program product for utilizing flexible bandwidth channels within a code division multiple access communications system comprising:
a non-transitory computer-readable medium comprising:
code for identifying a chip rate of a mobile device for a normal bandwidth code division multiple access channel;
code for identifying spectrum to be used for a flexible bandwidth code division multiple access channel separate from spectrum occupied by the normal bandwidth channel, the identified spectrum comprising spectrum determined to be available for use for the flexible bandwidth channel;
code for determining a chip rate for the flexible bandwidth channel based at least in part on the available spectrum to be used for the flexible bandwidth channel;
code for adapting the chip rate of the mobile device dynamically utilizing a scaling factor, the adaptation from the chip rate for the normal bandwidth channel to the chip rate for the flexible bandwidth channel; and
code for transmitting over the flexible bandwidth channel on the available spectrum utilizing the chip rate for the flexible bandwidth channel.

40. The computer program product of claim 39, wherein the non-transitory computer-readable medium further comprising:
code for receiving adaptation information from a base station to adapt the chip rate of the mobile device dynamically.

41. The computer program product of claim 39, wherein the non-transitory computer-readable medium further comprising:
code for tuning from a first center frequency to a second center frequency as the mobile device adapts the chip rate.

42. The computer program product of claim 40, wherein the non-transitory computer-readable medium further comprising:
code for receiving one or more center frequencies to identify the flexible bandwidth channel.

43. The computer program product of claim 39, wherein the non-transitory computer-readable medium further comprising:
code for receiving one or more flexible bandwidth waveforms over the flexible bandwidth channel.

44. The computer program product of claim 39, wherein adapting the chip rate includes adapting a frequency of processing of the mobile device, a frequency of at least one clock, wherein the at least one clock includes at least one of an Analog-to-Digital Conversion (ADC) clock, a Digital-to-Analog Conversion (DAC) clock, a processing clock, or an offline clock.

45. A wireless communications device configured for utilizing flexible bandwidth channels in a code division multiple access system, the wireless communications device comprising:
at least one processor configured to:
identify a chip rate of a mobile device for a normal bandwidth code division multiple access channel;
identify spectrum to be used for a flexible bandwidth code division multiple access channel separate from spectrum occupied by the normal bandwidth channel, the identified spectrum comprising spectrum determined to be available for use for the flexible bandwidth channel;
determine a chip rate for the flexible bandwidth channel based at least in part on the available spectrum to be used for the flexible bandwidth channel;
adapt the chip rate of the mobile device dynamically utilizing a scaling factor, the adaptation from the chip rate for the normal bandwidth channel to the chip rate for the flexible bandwidth channel; and
transmit over the flexible bandwidth channel on the available spectrum utilizing the chip rate for the flexible bandwidth channel; and
at least one memory coupled with the at least one processor.

46. The wireless communications device of claim 45, wherein the at least one processor is further configured to:
   receive adaptation information from a base station to adapt the chip rate of the mobile device dynamically.

47. The wireless communications device of claim 45, wherein the at least one processor is further configured to:
   move from a normal bandwidth channel to the flexible bandwidth channel as the mobile device adapts the chip rate.

48. The wireless communications device of claim 46, wherein the at least one processor is further configured to:
   receive one or more center frequencies to identify the flexible bandwidth channel.

49. The wireless communications device of claim 45, wherein the at least one processor is further configured to:
   receive one or more flexible bandwidth waveforms over the flexible bandwidth channel.

50. The wireless communications device of claim 45, wherein adapting the chip rate includes adapting a frequency of processing of the mobile device, a frequency of at least one clock, wherein the at least one clock includes at least one of an Analog-to-Digital Conversion (ADC) clock, a Digital-to-Analog Conversion (DAC) clock, a processing clock, or an offline clock.

51. A code division multiple access communications system configured for utilizing flexible bandwidth, the code division multiple access communications system comprising:
   a means for determining a chip rate at a base station for a normal code division multiple access bandwidth channel;
   a means for identifying available spectrum to be used for a flexible bandwidth code division multiple access channel separate from spectrum occupied by the normal bandwidth channel;
   a means for determining a chip rate for the flexible bandwidth channel based at least in part on the available spectrum to be used for the flexible bandwidth channel;
   a means for configuring the flexible bandwidth channel over the available spectrum to utilize the chip rate for the flexible bandwidth channel;
   a means for transmitting a first waveform on the normal bandwidth channel utilizing the chip rate for the normal bandwidth channels; and
   a means for transmitting, concurrently with the transmission of the first waveform, a second waveform on the flexible bandwidth channel utilizing the chip rate for the flexible bandwidth channel.

52. The wireless communications system of claim 51, further comprising:
   a means for transmitting configuration information from the base station to a mobile device to inform the mobile device of the chip rate for the flexible bandwidth channel.

53. The wireless communications system of claim 52, further comprising:
   a means for transmitting one or more center frequencies from the base station to the mobile device to identify the flexible bandwidth channel.

54. The wireless communications system of claim 51, wherein adapting the chip rate is based on at least a requested quality of service, a load, or a coverage of one or more adjacent cells.

55. The wireless communications system of claim 51, further comprising:
   a means to split a frequency channel into a plurality of narrower frequency channels.

56. The wireless communications system of claim 51, further comprising:
   a means for combining a plurality of frequency channels into a wider frequency channel.

57. A computer program product for utilizing flexible bandwidth within a code division multiple access communications system comprising:
   a non-transitory computer-readable medium comprising:
      code for determining a chip rate at a base station for a normal code division multiple access bandwidth channel;
      code for identifying available spectrum to be used for a flexible bandwidth code division multiple access channel separate from spectrum occupied by the normal bandwidth channel;
      code for determining a chip rate for the flexible bandwidth channel based at least in part on the available spectrum to be used for the flexible bandwidth channel;
      code for configuring the flexible bandwidth channel over the available spectrum to utilize the chip rate for the flexible bandwidth channel;
      code for transmitting a first waveform on the normal bandwidth channel utilizing the chip rate for the normal bandwidth channels; and
      code for transmitting, concurrently with the transmission of the first waveform, a second waveform on the flexible bandwidth channel utilizing the chip rate for the flexible bandwidth channel.

58. The computer program product of claim 57, wherein the non-transitory computer-readable medium further comprising:
   code for transmitting configuration information from the base station to a mobile device to inform the mobile device of the chip rate for the flexible bandwidth channel.

59. The computer program product of claim 58, wherein the non-transitory computer-readable medium further comprising:
   code for transmitting one or more center frequencies from the base station to the mobile device to identify the flexible bandwidth channel.

60. The computer program product of claim 57, wherein adapting the chip rate is based on at least a requested quality of service, a load, or a coverage of one or more adjacent cells.

61. A wireless communications device configured for utilizing flexible bandwidth in a code division multiple access system, the wireless communications device comprising:
   at least one processor configured to:
      determine a chip rate at a base station for a normal code division multiple access bandwidth channel;
      identify available spectrum to be used for a flexible bandwidth code division multiple access channel separate from spectrum occupied by the normal bandwidth channel;
      determine a chip rate for the flexible bandwidth channel based at least in part on the available spectrum to be used for the flexible bandwidth channel;
      configure the flexible bandwidth channel over the available spectrum to utilize the chip rate for the flexible bandwidth channel;
      transmit a first waveform on the normal bandwidth channel utilizing the chip rate for the normal bandwidth channels; and transmit, concurrently with the transmission of the first waveform, a second waveform on the flexible bandwidth channel utilizing the chip rate for the flexible bandwidth channel; and at least one memory coupled with the at least one processor.

62. The wireless communications device of claim 61, wherein the at least one processor is further configured to:

transmit configuration information from the base station to a mobile device to inform the mobile device of the chip rate for the flexible bandwidth channel.

63. The wireless communications device of claim 62, wherein the at least one processor is further configured to:

transmit one or more center frequencies from the base station to the mobile device to identify the flexible bandwidth channel.

64. The wireless communications device of claim 61, wherein adapting the chip rate is based on at least a requested quality of service, a load, or a coverage of one or more adjacent cells.

65. The method of claim 15, wherein both the first wave form on the normal bandwidth channel and the second waveform on the flexible bandwidth channel are concurrently transmitted from the base station to a mobile device.

* * * * *